(12) United States Patent
Kumar et al.

(10) Patent No.: US 9,376,123 B2
(45) Date of Patent: Jun. 28, 2016

(54) INTEGRATED FRICTION MODIFICATION SYSTEM FOR A TRANSPORATION NETWORK VECHICLE

(75) Inventors: Ajith Kuttannair Kumar, Erie, PA (US); David Eldredge, Melbourne, FL (US); Daniel Ballesty, Melbourne, FL (US); Jared Klineman Cooper, Melbourne, FL (US); Christopher Roney, Melbourne, FL (US)

(73) Assignee: General Electric Company, Schenectady, NY (US)

(*) Notice: Subject to any disclaimer, the term of this patent is extended or adjusted under 35 U.S.C. 154(b) by 790 days.

(21) Appl. No.: 13/591,561

(22) Filed: Aug. 22, 2012

(65) Prior Publication Data
US 2014/0058570 A1 Feb. 27, 2014

(51) Int. Cl.
*G06F 7/00* (2006.01)
*G05B 13/00* (2006.01)
*G05D 11/00* (2006.01)
*B61C 17/12* (2006.01)
*B61C 15/00* (2006.01)
*B61L 27/00* (2006.01)
*B61L 15/00* (2006.01)

(52) U.S. Cl.
CPC ............... *B61C 17/12* (2013.01); *B61C 15/00* (2013.01); *B61L 15/0027* (2013.01); *B61L 27/0027* (2013.01); *Y02T 30/10* (2013.01)

(58) Field of Classification Search
None
See application file for complete search history.

(56) References Cited

U.S. PATENT DOCUMENTS

| | | | |
|---|---|---|---|
| 4,214,647 A | 7/1980 | Lutts | |
| 5,775,228 A | 7/1998 | Lamba et al. | |
| 6,499,815 B1 | 12/2002 | Daigle | |
| 6,585,085 B1 * | 7/2003 | Kumar | 184/3.2 |
| 7,290,807 B2 | 11/2007 | Kumar | |
| 7,467,830 B2 | 12/2008 | Donnelly | |
| 2002/0157901 A1 * | 10/2002 | Kast et al. | 184/3.2 |
| 2005/0253397 A1 * | 11/2005 | Kumar et al. | 291/2 |
| 2007/0183039 A1 * | 8/2007 | Irvin | 359/507 |
| 2007/0219680 A1 * | 9/2007 | Kumar et al. | 701/19 |

* cited by examiner

*Primary Examiner* — Mohammad Ali
*Assistant Examiner* — Bernard G Lindsay
(74) *Attorney, Agent, or Firm* — GE Global Patent Operation

(57) ABSTRACT

A system includes a vehicle control system, a friction modification unit, and a friction management module. The vehicle control system is configured to obtain a trip plan for the vehicle. The trip plan is based on one or more characteristics of a trip of the vehicle along a route in a transportation network, characteristics of the vehicle, or characteristics of the route along which the vehicle travels. The trip plan designates one or more tractive operations or braking operations. The friction modification unit is configured to modify a friction characteristic of a surface of the route as the vehicle travels on the route. The friction management module is configured to direct the friction modification unit to modify the friction characteristic of the surface of the route based on the trip plan.

32 Claims, 5 Drawing Sheets

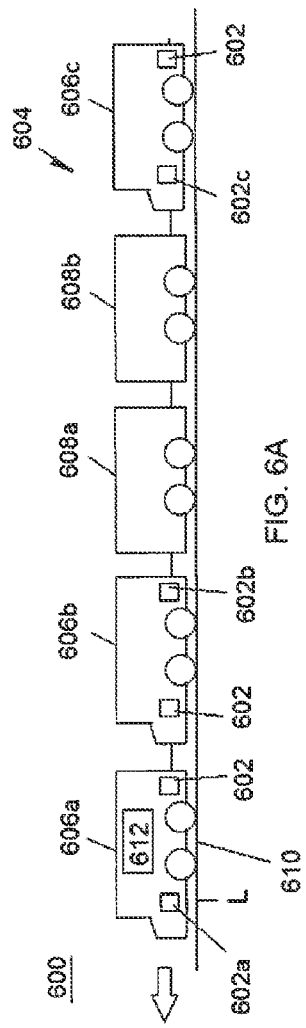
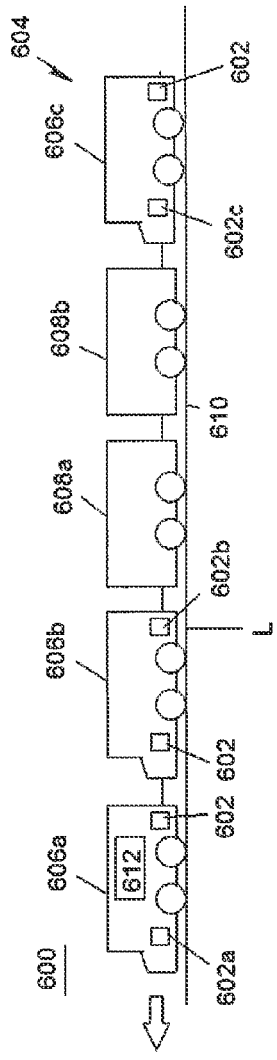
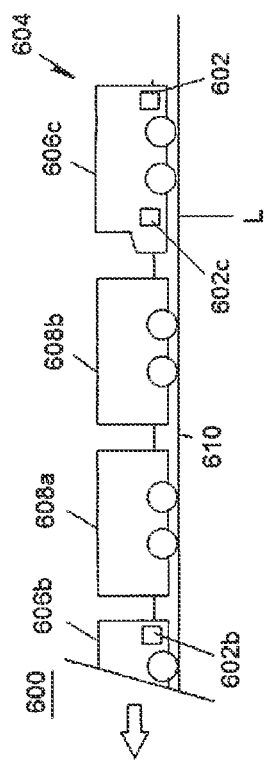
FIG. 6A
FIG. 6B
FIG. 6C

INTEGRATED FRICTION MODIFICATION SYSTEM FOR A TRANSPORATION NETWORK VECHICLE

FIELD

Embodiments of the subject matter described herein relate to scheduling systems for vehicles traveling in a transportation network.

BACKGROUND

A transportation network for vehicles can include several interconnected main routes on which separate vehicles travel between locations. For example, a transportation network may be formed from interconnected railroad tracks with rail vehicles traveling along the tracks. The vehicles may travel according to schedules that dictate where and when the vehicles are to travel in the transportation network. The schedules may be coordinated with each other in order to arrange for certain vehicles to arrive at various locations in the transportation network at desired times and/or in a desired order. Each vehicle traveling through the network may also be controlled according to a pre-set plan for accomplishing a mission being performed by the vehicle.

For example, trains may travel along a network of tracks. Equipment may be used to manage the friction between the track and the wheels of the train to improve performance and efficiency. However, stand-alone devices suffer from a variety of drawbacks. For example, poor management of such devices, for example, results in reduced efficiency, waste of both fuel and friction management resources and resulting increased cost, as well as potentially unsafe or otherwise undesirable track conditions caused by inappropriate friction modification.

A need exists for improved control and management of friction modification for vehicle systems.

BRIEF DESCRIPTION

In one embodiment, a system includes a vehicle control system, a friction modification unit, and a friction management module. As used herein, the terms "system" and "module" include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hard-wired instructions, the software that directs hardware to perform the operations, or a combination thereof.

The vehicle control system is configured to be disposed onboard a vehicle and to obtain a trip plan for the vehicle. The trip plan is based on one or more characteristics of a trip of the vehicle along a route in a transportation network, characteristics of the vehicle, or characteristics of the route along which the vehicle travels during the trip. The trip plan designates at least one of one or more tractive operations or one or more braking operations of the vehicle during the trip. The friction modification unit is configured to be disposed onboard the vehicle and to modify a friction characteristic of a surface of the route as the vehicle travels on the route. The friction management module is configured to direct the friction modification unit to modify the friction characteristic of the surface of the route based on the trip plan.

In another embodiment, a method includes accessing information of an energy management module of a vehicle. The information includes at least one of positional information, route information, or trip information. The positional information includes information regarding the location of a friction modification unit on the vehicle, the route information includes information regarding characteristics of a route over which the vehicle travels, or the trip information includes information regarding tractive or braking efforts of the vehicle. The method also includes autonomously determining, at a controller, a friction modification activity, using the information of the energy management module. The friction modification activity is configured to modify a surface over which the vehicle is traveling. The method also includes controlling the friction modification unit to perform the friction modification activity.

In another embodiment, another system includes an energy management module configured to be disposed onboard a vehicle that travels in a transportation network formed from interconnected routes. The energy management module is configured to generate a trip plan for a control unit of the vehicle that is used to control tractive efforts of the vehicle as the vehicle travels in the transportation network. The system also includes a friction modification unit configured to be disposed onboard the vehicle. The friction modification unit is configured to modify a friction characteristic of a surface of a route over which the vehicle travels by at least one of adding a material to the surface or removing a previously present material from the surface. Further, the system includes a friction management module configured to be disposed onboard the vehicle and operably connected to the friction modification unit. The friction management module configured to receive information from the energy management module and to use the information received from the energy management module to control the friction modification unit. The information received from the energy management module includes at least one of positional information representative of the location of the friction modification unit on the vehicle, route information representative of information regarding characteristics of the route over which the vehicle is traveling, or trip information representative of at least one of tractive or braking efforts of the vehicle. The energy management module is configured to modify the trip plan using information regarding one or more friction management activities performed by the friction modification unit.

In another embodiment, another system (e.g., for modifying friction on a surface of a route) includes a friction modification unit and a friction management module. The friction modification unit is configured to be disposed onboard a vehicle consist having plural vehicles connected with each other. The friction modification unit also is configured to modify a friction characteristic of a surface of a route over which the vehicle consist travels. The friction management module is configured to be communicatively coupled with the friction modification unit. The friction management module also is configured to control when the friction modification unit modifies the friction characteristic of the surface of the route based on a location of the friction modification unit in the vehicle consist.

BRIEF DESCRIPTION OF THE DRAWINGS

The present inventive subject matter will be better understood from reading the following description of non-limiting embodiments, with reference to the attached drawings, wherein below:

FIGS. 6A, 6B, and 6C are schematic diagrams of a consist traversing a location, according to embodiments of the invention.

DETAILED DESCRIPTION

One or more embodiments of the inventive subject matter described herein provide systems for controlling one or more friction modification activities, for example, using information associated with other control activities of a consist. The friction management activities may be integrated with other control activities of the consist, such as tractive or braking efforts. A technical effect of embodiments includes improvement in safety, for example, by avoiding performing a particular friction management activity in an inappropriate location or at an inappropriate time. An additional technical effect of embodiments includes improvements in the effectiveness of friction management activities. A still further additional technical effect of embodiments is the improvement of efficiency and/or performance of a vehicle, for example due to improved friction management, or as another example, improvement to a trip plan by accounting for friction management activities. A still further technical effect of embodiments is cost savings, for example reduced cost achieved by selecting locations of maximum effectiveness and return on expended friction modification resources, such as friction modifying agent, as well as savings regarding associated fuel costs.

Embodiments provide for the integration of energy management or trip planning and friction management. For example, friction modification activities may be determined and/or implemented using information used by an energy management module in determining a trip plan. Such information may include train information, such as locomotive road numbers (e.g. horsepower, length) car characteristics (e.g. tonnage, length, axles, coupler type, brake characteristics, drag characteristics), positions of each locomotive and car in a consist, train types and related speed limits or restrictions including distributed power restrictions, or orientation of locomotives (e.g. long hood forward or short hood forward). The information may also include route or track information, such as GPS coordinates, grade, curvature, switch and/or signal location, track mode markers, civil speed limits or restrictions, or super elevation or grade crossing information. Further, the information may also include travel information, such as arrival or travel time, or any temporary speed limits or other restrictions associated with particular mission.

Figure 1:
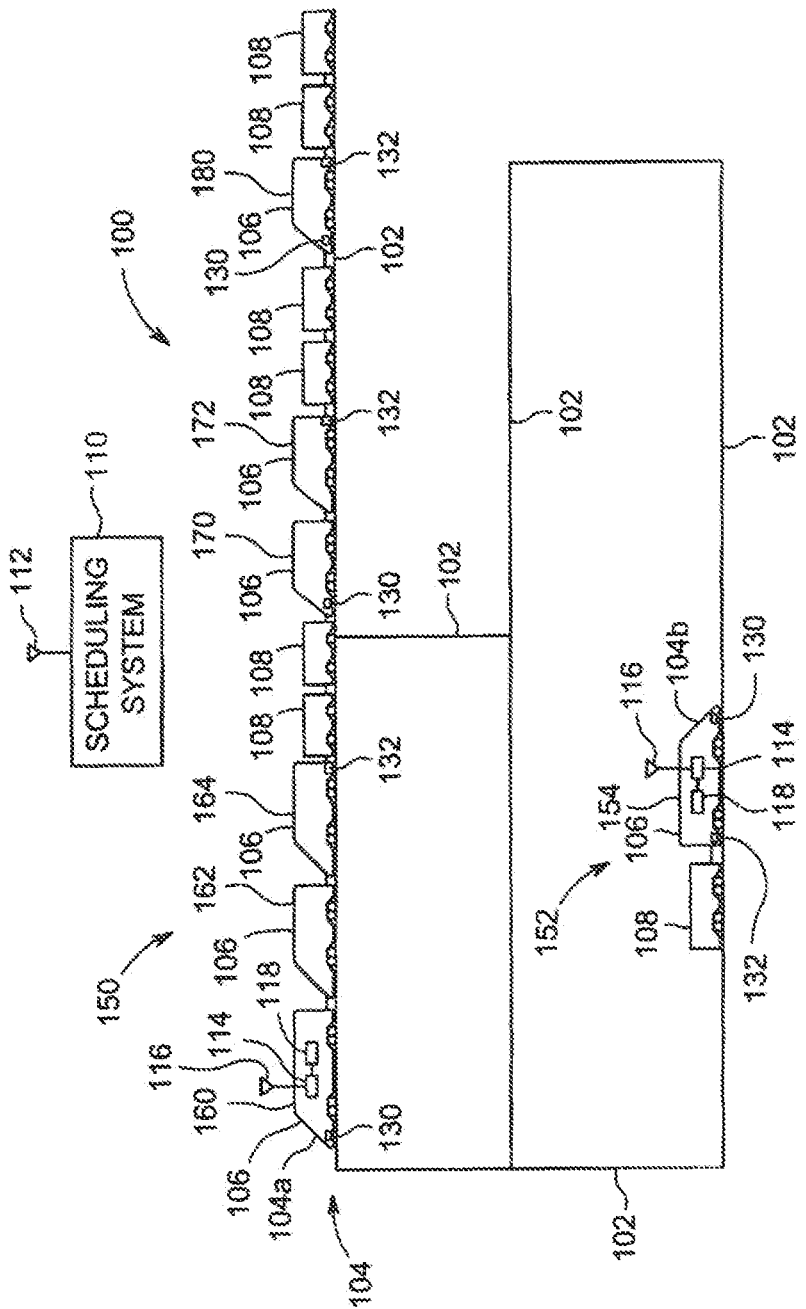
FIG. 1 is a schematic diagram of one embodiment of a transportation network.

FIG. 1 is a schematic diagram of one embodiment of a transportation network 100. The transportation network 100 includes a plurality of interconnected routes 102, such as railroad tracks, roads, or other paths across which vehicles travel. The transportation network 100 may extend over a relatively large area, such as hundreds of square miles or kilometers of land area. While only one transportation network 100 is shown in FIG. 1, one or more other transportation networks 100 may be joined with and accessible to vehicles traveling in the illustrated transportation network 100. For example, one or more of the routes 102 may extend to another transportation network 100 such that vehicles can travel between the transportation networks 100. Different transportation networks 100 may be defined by different geographic boundaries, such as different towns, cities, counties, states, groups of states, countries, continents, and the like. The number of routes 102 shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel.

Several vehicles 104 travel along the routes 102 in the transportation network 100. The vehicles 104 may concurrently travel in the transportation network 100 along the same or different routes 102. Travel of one or more vehicles 104 may be constrained to travel within the transportation network 100 (referred to herein as "intra-network travel"). Alternatively, one or more of the vehicles 104 may enter the transportation network 100 from another transportation network or leave the transportation network 100 to travel into another transportation network (referred to herein as "inter-network travel"). In the illustrated embodiment, the vehicles 104 are shown and described herein as rail vehicles or rail vehicle consists. However, one or more other embodiments may relate to vehicles other than rail vehicles or rail vehicle consists. For example, the vehicles 104 may represent other off-highway vehicles, automobiles, and the like. The vehicles 104 are individually referred to by the reference numbers 104$a$ and 104$b$. While two vehicles 104 are shown in FIG. 1, alternatively, a different number of vehicles 104 may be concurrently traveling in the transportation network 100.

A vehicle 104 may include a group of powered units 106 (e.g., locomotives or other vehicles capable of self-propulsion) and/or non-powered units 108 (e.g., cargo cars, passenger cars, or other vehicles incapable of self-propulsion) that are mechanically coupled or linked together to travel along the routes 102. The term "powered" refers to the capability of the units 106 to propel themselves and not to whether the units 106 or 108 receive energy (e.g., electric current) for one or more purposes. For example, the non-powered units 108 may receive electric current to power one or more loads disposed onboard the non-powered units 108. A group or series of units 106, 108 that are coupled with each other to travel as a unit can be referred to as a consist. Additionally or alternatively, several consists of units 106, 108 can be connected with each other to travel as a unit. The routes 102 are interconnected to permit the vehicles 104 to travel over various combinations of the routes 102 to move from a starting location to a destination location.

In the illustrated embodiment, a first consist 150 and a second consist 152 are traveling in the transportation network 100. In another embodiment, only a single one of the consists 150,152 may be traveling or a greater number of consists 150, 152 may be traveling in the transportation network 100. The first consist 150 includes powered units 160, 162, and 164 positioned in a first powered unit grouping; powered units 170 and 172 positioned in a second powered unit grouping; and powered unit 180 positioned in a third powered unit grouping (of which powered unit 180 is the only powered unit). Thus, a consist may include various groupings of powered units with non-powered units disposed therebetween. The second consist 152 comprises a single powered unit 154.

In FIG. 1, the first consist 150 is depicted as travelling in a generally right to left direction, while the second consist 152 is depicted as travelling a generally left to right direction. The powered unit 160 may be considered a lead powered unit of the first consist 150, and the powered unit 180 may be considered a trail powered unit of the first consist 150. The embodiment of FIG. 1 is provided for illustrative purposes only, as other arrangements, orientations, and/or numbers of powered units and/or non-powered cars may be used in other embodiments. In embodiments, the lead powered unit (e.g. powered unit 160 in the illustrated embodiment) may control the operations of other, remote powered units. In other embodiments, a powered unit other than the lead powered unit may act to control the operations of one or more other powered units.

The vehicles 104 may travel along the routes 102 according to a movement plan of the transportation network 100. The movement plan coordinates movement of the vehicles 104 in the transportation network 100. For example, the movement plan may include schedules for the vehicles 104 to move from a starting location or a current location to a destination location at a scheduled arrival time. Each schedule may dictate a destination location and the scheduled arrival time for a vehicle 104. Alternatively, the schedule may include one or more intermediate events for the vehicle 104 prior to reaching the destination location at the scheduled arrival time, such as a location and/or time for the vehicle 104 to stop and refuel.

The movement plan may be determined by a scheduling system 110. As shown in FIG. 1, the scheduling system 110 can be disposed off-board (e.g., outside) of the vehicles 104. For example, the scheduling system 110 may be disposed at a central dispatch office for a railroad company. The scheduling system 110 can create and communicate the schedules to the vehicles 104. The scheduling system 110 can include a wireless antenna 112 (and associated transceiving equipment), such as a radio frequency (RF) or cellular antenna, that wirelessly transmits the schedules to the vehicles 104. For example, the scheduling system 110 may transmit destination locations and associated arrival times to the vehicles 104.

The vehicles 104 include control systems 114 disposed on-board the vehicles 104. The control systems 114 receive the schedules from the scheduling system 110 and generate control signals that may be used to control propulsion of the vehicles 104 through the transportation network 100. For example, the vehicles 104 may include wireless antennas 116 (and associated transceiving equipment), such as RF or cellular antennas, that receive the schedules from the scheduling system 110. The wireless antenna 116 communicates the received schedule to the control system 114 that may be disposed on-board the vehicle 104. The control system 114 examines the schedule, such as by determining the scheduled destination location and scheduled arrival time, and generates control signals based on the schedule.

The control signals may be used to automatically control tractive efforts and/or braking efforts of the vehicle 104 such that the vehicle 104 self-propels along the routes 102 to the destination location. For example, the control system 114 may be operatively coupled with a propulsion subsystem 118 of the vehicle 104. The propulsion subsystem 118 may include motors (such as traction motors), engines, brakes (such as air brakes and/or regenerative brakes), and the like, that generate tractive energy to propel the vehicle 104 and/or slow movement of the vehicle 104. The control system 114 may generate control signals that automatically control the propulsion subsystem 118, such as by automatically changing throttle settings and/or brake settings of the propulsion subsystem 118. (Self-propulsion includes automatic operation under the purview of an operator, who may have the option to take over manual control of the vehicle.)

In another embodiment, the control signals may be used to prompt an operator of the vehicle 104 to manually control the tractive efforts and/or braking efforts of the vehicle 104. For example, the control system 114 may include an output device, such as a computer monitor, touchscreen, acoustic speaker, or the like, that generates visual and/or audible instructions based on the control signals. The instructions may direct the operator to manually change throttle settings and/or brake settings of the propulsion subsystem 118.

The control system 114 may form a trip plan for a trip of the vehicle 104 to travel to a scheduled destination location at a scheduled arrival time. The trip plan may include throttle settings, brake settings, designated speeds, or the like, of the vehicle 104 for various sections of the trip of the vehicle 104. For example, the trip plan can include one or more velocity curves that designate various speeds of the vehicle 104 along various sections of the routes 102. The trip plan can be formed based on a trip profile associated with an upcoming trip of a vehicle 104. The trip profile can include information related to the vehicle 104, the routes 102 over which the vehicle 104 will traverse during the upcoming trip, and/or other information. The information related to the vehicle 104 can include the type of vehicle 104, the tractive energy generated by powered units 106 in the vehicle 104, the weight or mass of the vehicle 104 and/or cargo being carried by the vehicle 104, the length and/or other size of the vehicle 104 (e.g., how many powered and non-powered units 106, 108 are mechanically coupled with each other in the vehicle 104), and the like. The information related to the route 102 can include the curvature, grade (e.g., inclination), existence of ongoing repairs, speed limits, and the like, for one or more sections of the route 102. The other information can include information related to conditions that impact how much fuel the vehicles 104 consume while traveling, such as the air pressure, temperature, humidity, and the like. The control system 114 may form the control signals based on the trip plan.

The transportation network 100 also includes friction modification units 130 and 132. The friction modification units 130, 132 of the illustrated embodiment are disposed onboard powered units (e.g. powered units 154, 160, 164, 170, 172, and 180), and are configured to modify a top surface of a rail over which the powered units travel. Alternatively or additionally, the friction modification units may be configured to modify the friction between a side flange of the wheels and a flange of the rail. Further alternatively or additionally, friction modification units may be located at locations remote from the powered unit, such as a wayside. The remote locations may be generally fixed, or may be mobile. In the illustrated embodiment, the network 100 includes leading friction modification units 130 and trailing friction modification units 132. The leading friction modification units 130 are located toward the front of a given powered unit in the direction of travel, while the trailing friction modification units 132 are located toward the rear of a given powered unit in the direction of travel. (When the direction of travel is reversed, then friction modification units 130 may be considered trailing units and the friction modification units 132 may be considered leading units.) In embodiments, a friction modification unit or units may be employed that are configured to selectably increase or decrease the friction (for example, by increasing or decreasing a coefficient of friction between wheels of the consist and a surface, such as the top of the rail), with such friction modification units located, for example, at one or both ends of a powered unit or powered units. Similarly, friction modification units may be disposed toward the front and rear of some or all of the powered units of a consist. Also, a single friction modification unit may be used for both sides of a route, such as both sides of a track. Optionally, the friction modification of each side of the track may be controlled independently of the other side. In embodiments, friction modification units are dedicated to a single side of the track. Further still, friction modification units may be disposed aboard non-powered cars as well.

In the illustrated embodiment, the leading friction modification units 130 are configured to increase the coefficient of friction between the route and the wheels of an associated powered unit or powered units. For example, in embodiments, the leading friction modification unit 130 comprises a sand distribution unit that distributes sand to the route. Alternatively or additionally, the leading friction modification unit 130 may comprise a cleaning unit configured to clean a route and/or remove lubricant from a route. For example, the leading friction modification unit 130 may include a high pressure air device. In embodiments, the high pressure air device may receive air from the air brake system of a vehicle. By increasing the friction between the wheels of the powered wheels and the route, tractive and/or braking efficiency of the powered vehicles may be improved.

The trailing friction modification units 132 may be configured to decrease the coefficient of friction between the route and the wheels of an associated non-powered vehicle (such as a cargo car) or non-powered vehicles. For example, in embodiments, the trailing friction modification unit 132 comprises a lubrication distribution unit that distributes lubricant to the route. The lubricant may be distributed to the top of the route or rail, and/or to a side or flange of the route or rail. By reducing the friction between the wheels of the non-powered vehicles, the non-powered vehicles may be more easily pulled (or pushed) along a route. As another example, the leading friction modification unit 130 may also be configured to decrease the coefficient of friction between the route and the wheels of powered units of a consist. For example, the coefficient of friction may be reduced when a relatively low tractive effort is required, such as when a consist is traveling at a relatively constant high speed. In alternate embodiments, the friction increasing and decreasing equipment may be consolidated in a single friction modification unit.

For example, with reference to FIG. 1, the first consist 152 may be traveling in a generally right to left direction with the powered unit 160 acting as the lead powered unit of the first consist 152. To improve the efficiency of the tractive effort of the powered units 160, 162, and 164 of the first group of powered units, the leading friction modification unit may be used to increase the friction between the route and the wheels of the powered units 160, 162, and 164, for example, by adding sand to the route, or as another example, by using air pressure to clean the route. Then, to improve the efficiency of pulling the non-powered cars immediately behind the powered units 160, 162, and 164, the trailing friction modification unit 132 of the powered unit 164 may be used to decrease the friction between the route and the wheels of the non-powered cars, for example, by removing sand and/or adding lubricant to the route that the powered units 160, 162, and 164 have just passed over.

As the powered units 170 and 172 approach the portion of route passed over by the first group of powered units and non-powered vehicles immediately behind the first group of powered units, it may be desirable to increase the friction for more efficient tractive or braking effort by the powered units 170 and 172. Thus, the leading friction modification unit 130 of the powered unit 170 may be used to increase the friction. Next, to improve the efficiency of pulling the non-powered cars immediately behind the powered units 170,172, the trailing friction modification unit 132 of the powered unit 172 may be used to decrease the friction between the route and the wheels of the non-powered cars, for example, by adding lubricant to the route that the powered units 170, 172 have just passed over.

Similarly, as the powered unit 180 approaches the portion of route passed over by the powered units 170, 172 and non-powered vehicles immediately behind the powered units 170, 172, it may be desirable to increase the friction for more efficient tractive or braking effort by the powered unit 180. Thus, the leading friction modification unit 130 of the powered unit 180 may be used to increase the friction. Next, to improve the efficiency of pulling the non-powered cars immediately behind the powered unit 180, the trailing friction modification unit 132 of the powered unit 180 may be used to decrease the friction between the route and the wheels of the non-powered cars, for example, by adding lubricant to the route that the powered unit 180 has just passed over.

In alternate embodiments, different sequences of increasing and decreasing friction may be employed. For example, a lead powered unit may be identified as the first powered unit in a consist relative to the direction of travel (powered unit 160 in the above discussed example). A trail powered unit may identified as the last powered unit in a consist relative to the direction of travel (powered unit 180 in the above discussed example). In certain embodiments, the leading friction modification unit of the lead powered unit may be used to increase the friction and the trailing modification unit of the trail powered unit may be used to decrease the friction. In the illustrated embodiment, such a friction modification plan or sequence would include the leading friction modification unit 130 of the powered unit 160 increasing the friction, and the trailing friction modification unit 132 of the powered unit 180 decreasing the friction. In some embodiments, the friction modification units interposed between leading friction modification unit 130 of the powered unit 160 and the trailing friction modification unit 132 of the powered unit 180 may remain idle, while in other embodiments, certain friction modification units interposed between the leading friction modification unit 130 of the powered unit 160 and the trailing friction modification unit 132 of the powered unit 180 may be used to adjust the friction based on, for example, diagnostic information provided by a sensor disposed onboard the first consist 150.

Thus, the friction modification units may be variously employed based on the position of a given friction modification unit along a consist. For example, a friction modification unit may be used to alter the friction between a portion of a rail vehicle and a route based on the friction modification unit's position relative to a lead powered unit of a consist, or, as another example, the friction modification unit's position relative to trail powered unit of a consist, or as another example, the friction modification unit's position relative to a grouping of powered units within a consist. In the illustrated embodiment, the friction modification units are controlled by the control system 114.

The control system 114, for example, utilizes information available to the control system 114 as part of controlling the tractive and braking efforts of a powered unit or consist or as part of generating a trip plan. For example, the control system 114 may have access to positional or distributional information regarding the consist. Such distributional or positional information may include, for example, the location of each powered unit in the consist, the location of a lead powered unit, the location of a trail powered unit, or the location or type of each non-powered vehicle in the consist, the location and type of friction modification units associated with the consist, and the distribution of weight generally along the length of the consist. The control system may additionally have access to route information regarding the route over which the consist is traveling. Such route information may include, for example, the location and curvature of curves along the route, the location of crossings and switches along the route, the location and slope of grades along the route, an identification of speed or other limits along the route, or an identification of areas along the route subject to construction and related limitations on the operation of the consist in such areas. Thus, a variety of information, including information describing the amount, type, and location of available friction modifying agents available, may be utilized by the control system 114 in generating a trip plan.

As another example, in embodiments, the control system 114 obtains information from the scheduling system 110. Such information may include the timing of when other consists may be traveling along the same route currently being traveled by the consist, weather conditions, route conditions encountered or reported by other consists, and progress or status of construction at construction areas along the route. Such information may also be used, for example, in determining a type or an amount of friction modification activity.

In embodiments, the control system 114 also uses diagnostic information to control the various friction modification units disposed on or otherwise associated with the consist. For example, one or more acoustic sensors may be disposed along the consist. The acoustic sensors may be used to sense sounds associated with a condition or conditions that indicate a route may require or benefit from the application of lubrication. For example, the acoustic sensors may detect a squeak or other noise associated with a need for additional lubricant. The control system 114 may use such information to control one or more friction modification units to dispose additional lubricant. As another example, wheel slippage may be detected, indicating a need for an increase in friction. The control system 114 may then, using such wheel slippage information, control one or more friction modification units to dispose sand or, as another example, clean the route, to increase friction and reduce the wheel slippage. As another example, an actual drag being experienced by the consist may be measured or otherwise determined, and compared with a predetermined predicted drag. The difference between the actual drag and the predetermined drag may be used by the control system 114 to determine if friction modification is appropriate, and, if friction modification is appropriate, the control system 114 may then control one or more friction modification units to make the appropriate adjustments.

A control unit, for example the control system 114 including a friction modification module, may thus be used to control the timing, location, or amount of friction modification activity performed by the friction modification units. In some embodiments, the control system or the friction modification module of the control system automatically or autonomously controls the friction modification activities without operator intervention. In other embodiments, the control system or the friction modification module of the control system provide a prompt to an operator to perform friction modification activities. By using, for example, distributional or positional information of a vehicle system, as well as upcoming operation characteristics of the system, the control system may determine and implement a friction modification plan to improve efficiency of the vehicle system.

Figure 2:
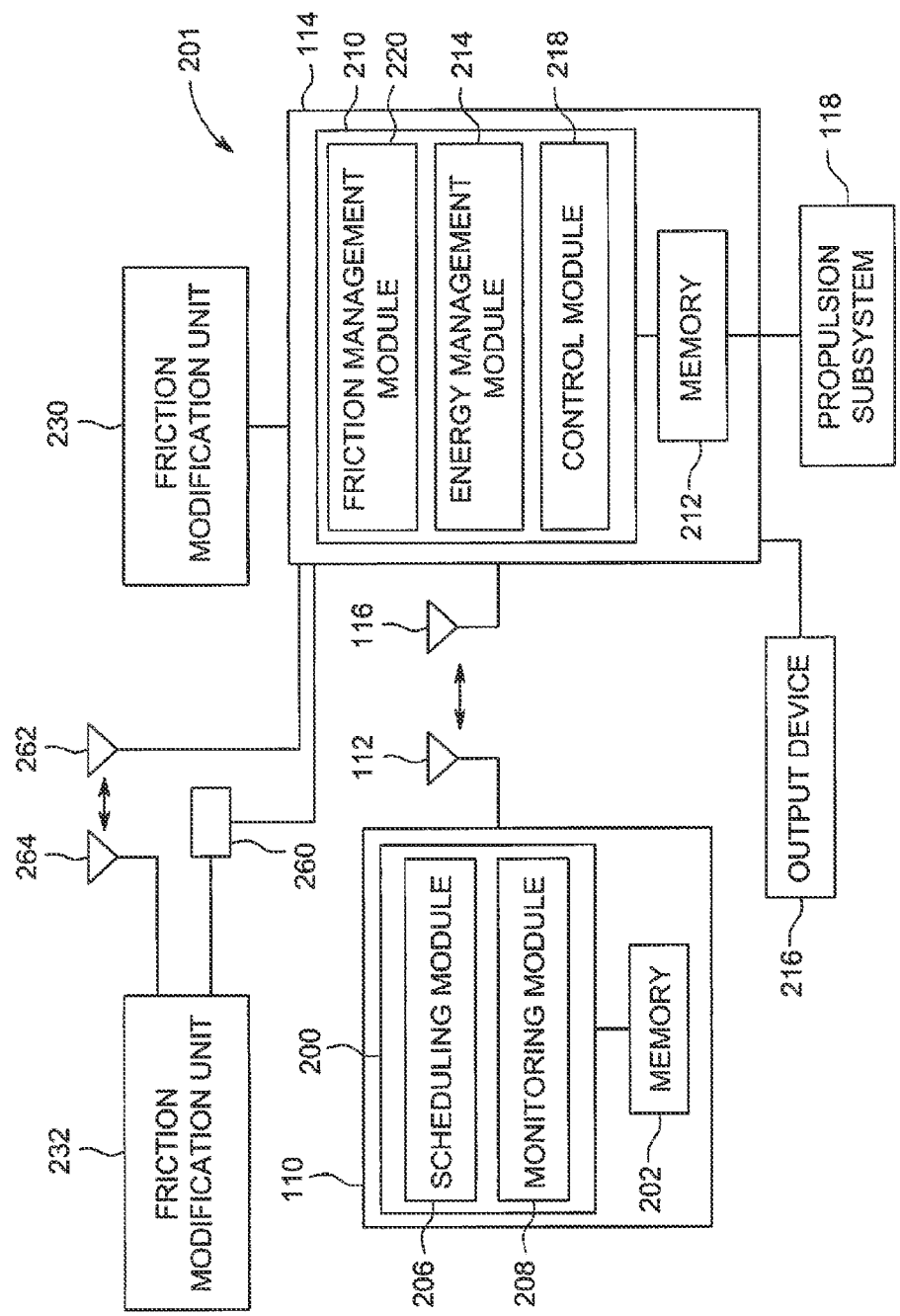
FIG. 2 is a schematic diagram of one embodiment of a system including a scheduling system and a control system shown in FIG. 1.

FIG. 2 is a schematic diagram of one embodiment of a system 201 including the scheduling system 110 and the control system 114. While the scheduling system 110 is shown in FIG. 2 as communicating with a single control system 114, in one embodiment, the scheduling system 110 can concurrently communicate with two or more control systems 114 disposed on-board two or more different (e.g., not mechanically coupled with each other) vehicles 104 (shown in FIG. 1).

The scheduling system 110 includes a controller 200, such as a computer processor or other logic-based device that performs operations based on one or more sets of instructions (e.g., software). The instructions on which the controller 200 operates may be stored on a tangible and non-transitory (e.g., not a transient signal) computer readable storage medium, such as a memory 202. The memory 202 may include one or more computer hard drives, flash drives, RAM, ROM, EEPROM, and the like. Alternatively, one or more of the sets of instructions that direct operations of the controller 200 may be hard-wired into the logic of the controller 200, such as by being hard-wired logic formed in the hardware of the controller 200.

The scheduling system 110 includes several modules that perform various operations described herein. The modules are shown as being included in the controller 200. As described above, the modules may include hardware and/or software systems that operate to perform one or more functions, such as the controller 200 and one or more sets of instructions. Alternatively, one or more of the modules may include a controller that is separate from the controller 200.

The scheduling system 110 includes a scheduling module 206 that creates schedules for the vehicles 104 (shown in FIG. 1). In one embodiment, the scheduling module 206 controls communication between the scheduling system 110 and the vehicles 104. For example, the scheduling module 206 may be operatively coupled with the antenna 112 to permit the scheduling module 206 to control transmission of data (e.g., schedules) to the vehicles 104 and to receive data (e.g., trip plans, amounts of fuel carried by the vehicles 104, or the like) from the vehicles 104. Alternatively, another module or the controller 200 may be operatively coupled with the antenna 112 to control communication with the vehicles 104.

The scheduling module 206 creates schedules for the vehicles 104 (shown in FIG. 1). The scheduling module 206 can form the movement plan for the transportation network 100 (shown in FIG. 1) that coordinates the schedules of the various vehicles 104 traveling in the transportation network 100. For example, the scheduling module 206 may generate schedules for the vehicles 104 that are based on each other so that a throughput parameter of the transportation network 100 remains above a threshold.

The scheduling system 110 includes a monitoring module 208 in the illustrated embodiment. The monitoring module 208 can monitor travel of the vehicles 104 (shown in FIG. 1) in the transportation network 100 (shown in FIG. 1). The vehicles 104 may periodically report current positions of the vehicles 104 to the scheduling system 110 so that the monitoring module 208 can track where the vehicles 104 are located. Alternatively, signals or other sensors disposed alongside the routes 102 (shown in FIG. 1) of the transportation network 100 can periodically report the passing of vehicles 104 by the signals or sensors to the scheduling system 110. The monitoring module 208 receives the locations of the vehicles 104 in order to monitor where the vehicles 104 are in the transportation network 100 over time.

Alternatively, the vehicle 104 (shown in FIG. 1) may adhere to the schedule by arriving at or passing through scheduled waypoints of the schedule at scheduled times that are associated with the waypoints, or within a predetermined time buffer of the scheduled times. As differences between actual times that the vehicle 104 arrives at or passes through the scheduled waypoints and the associated scheduled times of the waypoints increases, the statistical measure of adherence for the vehicle 104 may decrease. Conversely, as these differences decrease, the statistical measure of adherence may increase.

The scheduling module 206 creates schedules for the vehicles 104 (shown in FIG. 1) and transmits the schedules to the control systems 114 of the vehicles 104. In one embodiment, the scheduling module 206 may modify a previously created schedule that previously was sent to a vehicle 104. The scheduling module 206 may convey the schedules to the antenna 112, which transmits the schedules to the antennas 116 of the control systems 114 of the corresponding vehicles 104.

The control systems 114 of the vehicles 104 (shown in FIG. 1) receive the schedules sent by the scheduling system 110. In the illustrated embodiment, the control system 114 of a vehicle 104 includes a controller 210, such as a computer processor or other logic-based device that performs operations based on one or more sets of instructions (e.g., software). The instructions on which the controller 210 operates may be stored on a tangible and non-transitory (e.g., not a transient signal) computer readable storage medium, such as a memory 212. The memory 212 may include one or more computer hard drives, flash drives, RAM, ROM, EEPROM, and the like. Alternatively, one or more of the sets of instructions that direct operations of the controller 210 may be hard-wired into the logic of the controller 210, such as by being hard-wired logic formed in the hardware of the controller 210.

The control system 114 includes several modules that perform various operations described herein. The modules are shown as being included in the controller 210. As described above, the modules may include hardware and/or software systems that operate to perform one or more functions, such as the controller 210 and one or more sets of instructions. Alternatively, one or more of the modules may include a controller that is separate from the controller 210, or may be combined to form a combined module.

The control system 114 receives the schedules from the scheduling system 110. The controller 210 may be operatively coupled with the antenna 116 to receive the initial and/or modified schedules from the scheduling system 110. In one embodiment, the schedules are conveyed to an energy management module 214 of the control system 114. In another embodiment, the energy management module 214 may be disposed off-board the vehicle 104 (shown in FIG. 1) for which the trip plan is formed. For example, the energy management module 214 can be disposed in a central dispatch or other office that generates the trip plans for one or more vehicles 104.

The energy management module 214 receives the schedule sent from the scheduling system 110 and generates a trip plan based on the schedule. As described above, the trip plan may include throttle settings, brake settings, designated speeds, or the like, of the vehicle 104 (shown in FIG. 1) for various sections of a scheduled trip of the vehicle 104 to the scheduled destination location. The trip plan may be generated to reduce the amount of fuel that is consumed by the vehicle 104 as the vehicle 104 travels to the destination location relative to travel by the vehicle 104 to the destination location when not abiding by the trip plan.

In order to generate the trip plan for the vehicle 104 (shown in FIG. 1), the energy management module 214 can refer to a trip profile that includes information related to the vehicle 104, information related to the route 102 (shown in FIG. 1) over which the vehicle 104 travels to arrive at the scheduled destination, and/or other information related to travel of the vehicle 104 to the scheduled destination location at the scheduled arrival time. The information related to the vehicle 104 may include information regarding the fuel efficiency of the vehicle 104 (e.g., how much fuel is consumed by the vehicle 104 to traverse different sections of a route 102), the tractive power (e.g., horsepower) of the vehicle 104, the weight or mass of the vehicle 104 and/or cargo, the length and/or other size of the vehicle 104, the location of the powered units 106 (shown in FIG. 1) in the vehicle 104 (e.g., front, middle, back, or the like of a vehicle consist having several mechanically interconnected units 106, 108), or other information. The information related to the route 102 to be traversed by the vehicle 104 can include the shape (e.g., curvature), incline, decline, and the like, of various sections of the route 102, the existence and/or location of known slow orders or damaged sections of the route 102, and the like. Other information can include information that impacts the fuel efficiency of the vehicle 104, such as atmospheric pressure, temperature, and the like.

The trip plan is formulated by the energy management module 214 based on the trip profile. For example, if the trip profile requires the vehicle 104 (shown in FIG. 1) to traverse a steep incline and the trip profile indicates that the vehicle 104 is carrying significantly heavy cargo, then the energy management module 214 may form a trip plan that includes or dictates increased tractive efforts to be provided by the propulsion subsystem 118 of the vehicle 104. Conversely, if the vehicle 104 is carrying a smaller cargo load and/or is to travel down a decline in the route 102 (shown in FIG. 1) based on the trip profile, then the energy management module 214 may form a trip plan that includes or dictates decreased tractive efforts by the propulsion subsystem 118 for that segment of the trip. In one embodiment, the energy management module 214 includes a software application or system such as the Trip Optimizer™ system provided by General Electric Company.

The friction management module 220 determines appropriate friction modification activities to be carried out by the friction modification units 230, 232. The friction modification unit 230 is depicted as being disposed on the same powered unit as the control system 114, while the remote friction modification unit 232 is depicted as being disposed on a different powered unit of the same consist. The remote friction modification unit 232 in some embodiments communicates wirelessly with the control system 114. For example the control system 114 may have associated therewith an antenna 262 mounted, for example, on a lead powered unit. In other embodiments, for example, the antenna 262 may be mounted on a powered unit other than a lead powered unit that is being used to control a plurality of remote powered units. The remote friction modification unit 232 includes an antenna 264 for communication with the control system 114 via the antenna 262. For example, the antenna 264 may be mounted on a powered unit on which the remote friction modification unit 232 is disposed. Alternatively or additionally, the remote friction modification unit 232 may be communicatively coupled to the control system 114 via a hard-wired connection. In certain embodiments, remote friction modification units are disposed on powered units. In certain embodiments, remote friction modification units are disposed at fixed points along a route, for example, proximate to a curve or grade at which friction modification may be necessary relatively frequently.

Figure 3:
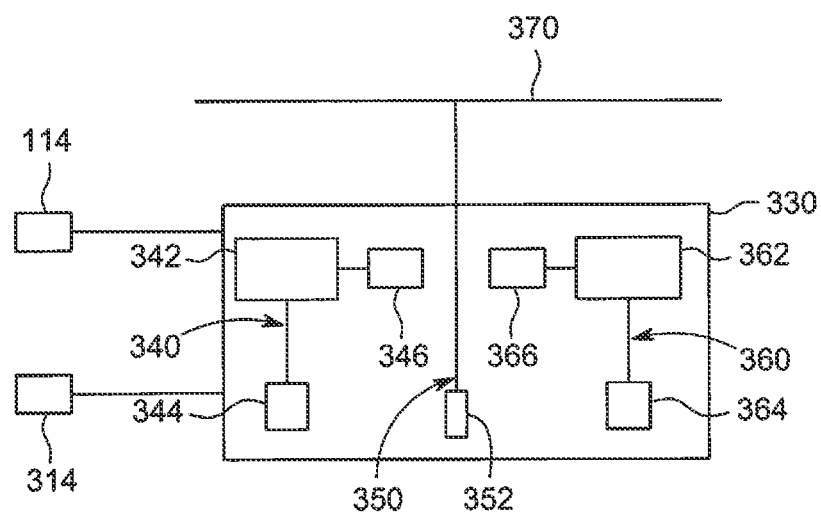
FIG. 3 is a schematic diagram of a friction modification unit in accordance with one embodiment.

In the illustrated embodiment, the friction modification unit 230 and the remote friction modification unit 232 are configured substantially similarly. FIG. 3 illustrates a schematic view of a friction modification unit 230 formed in accordance with an embodiment. The friction modification unit 230 includes a sanding portion 340, a cleaning portion 350, and a lubrication portion 360. The sanding portion 340 is configured to increase a coefficient of friction for a route by adding sand to a portion of the route. The cleaning portion 350 is configured to increase a coefficient of friction for a route by cleaning material, for example lubricant, off of a route. The lubrication portion 360 is configured to decrease a coefficient of friction for a route by adding lubricant to the route.

The sanding portion 340 includes a reservoir 342 and an applicator 344. In the illustrated embodiment, the reservoir 342 is depicted as being disposed on the friction modification unit 230. In some embodiments, the reservoir 342 may be located remotely from the friction modification unit 230. For example, a friction modification unit mounted at one location (for example a first end) of a powered unit may share a common reservoir with a friction modification unit mounted at a second location (for example a second end opposite the first end) of the powered unit. As another example, two friction modification units sharing a common reservoir may be positioned at a similar end of a powered unit, but on different sides of the powered unit so that each friction modification unit is associated with one side of the route. In some embodiments, separately controlled friction modification units may be associated with each side of the route. For example, different sides of a route may be modified differently based on a measured or sensed characteristic of the routes, or as another example, based on which side of the route is on the inside of a curve and which side of the route is on the outside of a curve. In some embodiments, a single friction modification unit, for example, with multiple nozzles attached to the same reservoir, may be used to modify both sides of a route at a given position along the length of the consist. The applicator 344 is configured to receive sand from the reservoir 342 and distribute the sand at a desired rate to a rail. For example, the applicator 344 may include an opening or a nozzle sized and configured to direct a stream of sand from the reservoir 342, along with appropriate control mechanisms and actuators to selectably allow or prevent sand from being distributed to the route, or controlling a rate at which the sand is applied to the route.

The sanding portion 340 also includes a sensor 346 that senses when a volume of the reservoir 342 has been depleted, or as another example, that senses when a certain threshold volume of sand has been passed. The sensor 346 may then communicate a message to a control unit, such as the control system 114, or as another example the energy management module 214, indicating that a given reservoir associated with a given friction modification unit or units is low or depleted. The control unit may then use the information regarding a depleted or low reservoir to select a different friction modification module to perform a friction modification activity. For example, if a reservoir for sanding from a lead powered unit is depleted, the control unit may then select an alternate friction modification unit, for example the nearest available friction modification unit having adequate sanding resources, to perform a desired friction increasing activity. Information from the sensor may also be used to provide an alert or warning to an operator to fill the affected reservoir at the next opportunity.

The cleaning portion 350 includes a nozzle 352 sized and configured to receive air and distribute the air to remove material, such as, for example, lubricant, or as another example, sand from a portion of the rail. For example, the nozzle 352 may be directed toward a top portion of the rail. Alternatively or additionally, the nozzle 352 may be directed to a side or flange portion of the rail. In some embodiments, the nozzle or dispenser for one or more portions of a friction modification unit is articulable and the direction of the nozzle or dispenser may be, for example, determined by the friction management module and controlled, for example, by the control module. In some embodiments, a cleaning portion 350 may include multiple nozzles, for example one nozzle directed at a top portion of a rail and another nozzle directed at a side or flange portion of a rail. In the illustrated embodiment, the nozzle 352 receives air from an air brake line 370 associated with an air braking system of the consist. In other embodiments, the nozzle 352 may receive air from a separate, dedicated supply. It should be noted that the cleaning portion 350 has been discussed in the context of increasing friction by removing lubricant or other material from a route. However, alternatively or additionally, the cleaning portion 350 may act to reduce friction by, for example, blowing or otherwise cleaning sand off of a route. For example, the sanding portion 340 of a leading portion of a powered unit may be used to apply sand to a route to increase friction for the powered unit, and a cleaning portion 350 of a trailing portion may be used to blow the sand off of the route as the powered unit passes, thereby reducing friction for non-powered vehicles being pulled behind the powered unit.

The lubrication portion 360 includes a reservoir 362 and an applicator 364. In the illustrated embodiment, the reservoir 362 is depicted as being disposed on the friction modification unit 230. In some embodiments, the reservoir 362 may be located remotely from the friction modification unit 230. For example, a single reservoir 362 may be shared by two or more friction modification units. The applicator 364 is configured to receive lubricant from the reservoir 362 and distribute the lubricant at a desired rate to a rail. For example, the applicator 364 may include an opening or a nozzle sized and configured to direct a stream of lubricant from the reservoir 362, along with appropriate control mechanisms and actuators to selectably allow or prevent lubricant from being distributed to the route, or controlling a rate at which the lubricant is applied to the route. One or more nozzles 364 may be employed to provide lubricant to a top portion of a rail, and, alternatively or additionally, to a side portion or flange of a rail.

The lubrication portion 360 also includes a sensor 366 that senses when a volume of the reservoir 362 has been depleted, or as another example, that senses when a certain threshold volume of sand has been passed. The sensor 366 may then communicate a message to a control unit, such as the control system 114, or as another example the energy management module 214, indicating that a given reservoir associated with a given friction modification unit or units is low or depleted. The control unit may then use the information regarding a depleted or low reservoir to select a different friction modification module to perform a friction modification activity. For example, if a reservoir for lubrication from a given powered unit selected to apply lubricant by the control unit is depleted, the control unit may then select an alternate friction modification module, for example the nearest available friction modification unit having adequate lubricant available, to perform a desired friction decreasing activity. Information from the sensor 366 may also be used to provide an alert or warning to an operator to fill the affected reservoir at the next opportunity.

Further, additional sensors may be associated with one or more of the portions of the friction modification unit 230. For example, sensors may be used to provide information regarding the amount of flow of a given material through a nozzle or associated line, or as another example, information may be provided regarding a faulty nozzle.

Thus, a single given friction modification unit 230 may include structures configured to increase friction and structures configured to decrease friction. Further, an operator interface 314 may be operably connected with the friction modification unit 230 to allow an operator to input control of the friction modification unit 230. In some embodiments, a friction modification unit may have a different combination of friction modifying portions than depicted in FIG. 3. For example, a friction modification unit may have a sanding portion and a lubrication portion, but not have a cleaning portion. In alternate embodiments, one or more friction modification units may be dedicated to friction increasing activities or to friction decreasing activities. For example, a given friction modification unit may only include a sanding portion, while another given friction modification unit may only include a lubrication portion.

Figure 4:
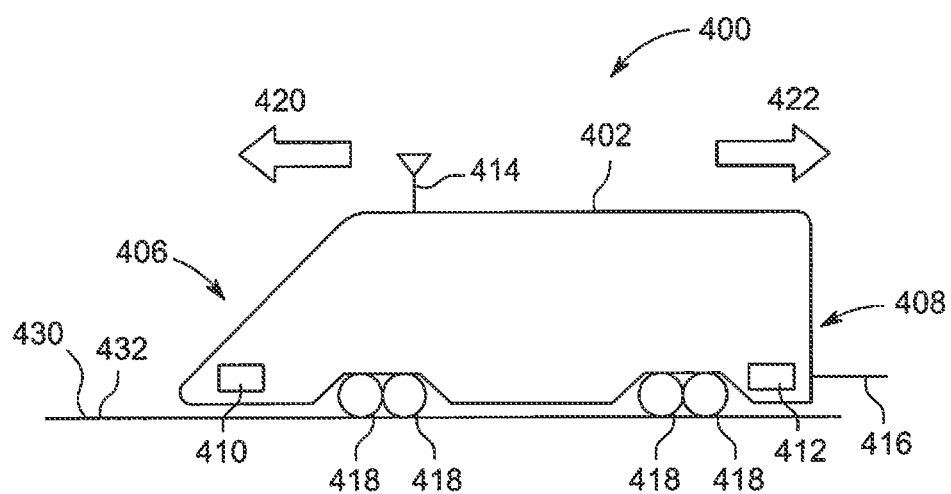
FIG. 4 is a schematic diagram of a powered unit having friction modification units in accordance with one embodiment.

FIG. 4 provides a schematic view of a vehicle system 400. The vehicle system 400 includes a powered unit 402 having a first friction modification unit 410 and a second friction modification unit 412 disposed thereon. The powered unit 402 travels over a route 430. The first and second friction modification units 410, 412 may be substantially similar to the friction modification unit 230 discussed above, and are configured to modify friction between the route 430 and the wheels 418 of the powered unit 402 by, for example, adding a material such as sand to a surface (e.g. the top of the rail 432) of the route 430 to increase the friction, or as another example, adding a material such as lubricant to the route 430 to decrease the friction, or as yet another example, removing a material such as lubricant from the route 430 to increase the friction.

The powered unit includes a first end 406 and a second end 408. The first end 406 may include, for example, an operator station. The powered unit 402 may be configured so that the first end 406 is more likely to be oriented forward when the powered unit 402 is performing a mission; however, the powered unit 402 may also be operated with the second end 408 oriented forward. The first friction modification unit 410 is disposed on the first end 406, and the second friction modification unit 412 is disposed on the second end 408.

In some embodiments, the friction modification units 410, 412 may be configured so that a single friction modification unit modifies the friction of both sides of the route over which the powered unit 402 is traveling. In some embodiments, separate friction modification units may be located on either side of the powered unit 402 at a given end of the powered unit 402, with each separate friction modification unit dedicated to one side of the route. In some embodiments, each side of the route may be modified independently of the other side of the route.

The friction modification units 410, 412 include structures configured to allow both increasing and decreasing of friction of a route over which the powered unit 402 travels. Thus, a control system or an operator may, for example, select a friction increasing mode or a friction decreasing mode of operation for a given friction modification unit. For example, when the powered unit 402 is traveling in direction 420, the first end 406 of the powered unit is the lead end, and the first friction modification unit 410 is the leading friction modification unit. Thus, when the powered unit 402 is traveling in direction 420, the first friction modification unit 410 may be selected for a friction increasing mode (such as sanding) and used to increase the friction between the wheels 418 of the powered unit 402 and the route. If the powered unit 402 is followed by a sequence of non-powered vehicles, the second friction modification unit 412 (the trailing friction modification unit) may be selected to operate in a lubricating mode.

The control unit may control not only the mode of operation (for example, what type of material is added to the route) but also the quantity of friction modification performed (for example, by controlling a rate, duration, or frequency at which a given material is added to the route).

Conversely, when the powered unit 402 is traveling in direction 422, the second end 408 of the powered unit is the lead end, and the second friction modification unit 412 is the leading friction modification unit. Thus, when the powered unit 402 is traveling in direction 422, the second friction modification unit 412 may be selected for a friction increasing mode (such as sanding) and used to increase the friction between the wheels 418 of the powered unit 402 and the route. If, when traveling in direction 422, the powered unit 402 is followed by a sequence of non-powered vehicles, the first friction modification unit 410 (the trailing friction modification unit when traveling in direction 422) may be selected to operate in a lubricating mode.

In alternate embodiments, other arrangements may be employed. Friction modification units, for example, may be limited to a single mode of operation. As another example, different types of friction modification units may be located at different locations of a powered unit or other car.

The powered unit 402 also includes an antenna 414. The antenna 414 is configured to facilitate wireless communication between the powered unit 402 and other powered units in a consist including the powered unit 402. For example, when the powered unit 402 is used to control other remote powered units, the powered unit 402 may transmit signals via the antenna 414 that include commands to control friction modification units disposed on other powered units. As another example, when the powered unit 402 is a remote powered unit, for example receiving commands from another powered unit, the powered unit may receive signals via the antenna 414 that include commands to control friction modification units disposed on the powered unit 402. Such communication may also include, for example, communication over a distributed power network, including information regarding the health, capability, or availability of friction modification units. With the position of various units known (for example, from the energy management module 214, or as another example, via GPS), the distance between cars or consists may be used in determining friction modification activities.

Similarly, the powered unit 402 may also communicate over a hard wire connection 416, for example, with one or more other powered units of a consist including the powered unit 402. The hard wire connection may be, for example, an electrical multiple unit connection. In some embodiments, a consist may communicate both wirelessly and via a hard wire connection. In addition to commands for operation, the messages or information exchanged between powered units may also include information regarding the location, type or capability of a friction modification unit located on a powered unit, or a status of a friction modification unit (e.g. the health or condition of the device).

Returning to FIG. 2, friction management module 220 uses information available from, for example, the energy management module 214, or as another example, the scheduling system 110 to determine friction modification activities, for example, to improve efficiency for a mission being performed. The information used to determine and control friction modification activities includes, for example, positional or distributional information, regarding both the types and locations of cars in a consist as well as the types or capabilities and locations of friction modification units in a consist. For example, generally speaking, it is often desirable to increase friction for powered vehicles that will be exerting tractive or braking efforts, while it is often desirable to decrease friction for non-powered vehicles. Thus, friction modification activities may be performed by appropriately located friction modification units to increase friction for powered vehicles and decrease friction for non-powered vehicles.

The energy management module 214 may include information regarding the makeup of the consist, information regarding the route along which the consist travels, and information regarding the travel or trip of the consist, including information regarding planned operation at various times or locations during the mission.

For example, information input into the energy management module 214 may include information regarding the consist, including characteristics such as available horsepower, available tractive effort, available braking effort, length of the consist, and position of particular cars within the consist. The information may also include characteristics of particular cars within the consist, including tonnage, length, axles, coupler type, brake characteristics, and drag characteristics. The information may also include, for example, train type information, related limits or restrictions on speed or other operation parameters, or any restrictions based on the distribution of the various cars in the consist. Information regarding the orientation of the powered units (for example long hood forward or short hood forward) may also be included. Also, the information may include friction modification information, such as the location, type, or amount of friction modifying agents or friction modification units available.

The information input into the energy management module 214 may also include, for example, information regarding the route, including GPS coordinates, grade, curvature, location of switches and signals, track mode markers, civil speed limits or other restrictions, and information regarding super elevation or grade crossings. Further, the information input into the energy management module 214 may also include travel information, such as, for example, arrival time, travel time, and temporary speed limit or other restrictions and the location or type of such restrictions. The information input into the energy management module 214 may be utilized to help determine appropriate friction modification activities before performance of a mission as well as during performance of a mission.

The energy management module 214 also may output information regarding, for example, current or upcoming speed or power, or as another example, current or upcoming braking efforts. For example, such information may include speed profile (speed as a function of position and time), power profile (a power level, such as a notch of a throttle control, as a function of position and time), and commands to one or more powered units, such as a motoring or propulsion throttle call, a dynamic brake throttle call, or an air brake call. The information output by the energy management module may be utilized to help determine appropriate friction modification activities before performance of a mission as well as during performance of a mission.

Thus, information from the energy management module, or other source, may be used to determine appropriate friction management activities, and to control the performance of the friction management activities.

For example, friction management activities may be determined based at least in part on future operation, such as tractive effort demand, braking demand, planned air braking, speed, or power. For example, if upcoming operations include braking or coasting, friction reduction activities (e.g. applying lubricant to a rail) may be avoided, or friction increasing activities (e.g. sanding) may be performed. For example, increased friction may be advantageous for dynamic braking or air braking operations, and friction may be increased when such operations are known to be upcoming, or as another example, otherwise scheduled friction reduction activities may be avoided when such operations are known to be upcoming.

The speed profile may also be used in determining friction management activities. For example, information regarding the speed may be used to adjust the amount of friction modification performed (for example a rate at which a friction modification agent such as sand or lubricant is applied to a route, or as another example the number of friction modification agents used to apply a given friction modification agent), which may also be based on the length of the train. At high speeds, for example, reduction of friction at the top of the rail may be allowed and friction enhancement (e.g. sanding) may be deactivated.

As another example, friction management activities may be determined based at least in part on the location of cars within a consist. By taking into account the location of various cars within a consist as well as the location of friction modification units within the consist, appropriate friction modification activities may be determined by a control unit. Also, appropriate friction modification units to perform the friction modification activities may be selected by a control unit by location. For example, information regarding the location of each powered vehicle, such as a powered unit, may be used in determining, for example, how much friction reducing agent (such as a lubricant) to dispense behind a given powered unit. For example, if a powered unit of interest has no powered units behind it or a considerable number of cars until the next powered unit is encountered, a greater quantity of lubricant may be applied by a friction modification unit proximate to the powered unit of interest. On the other hand, if other powered units follow the powered unit of interest more closely, then less or no lubricant may be applied by a friction modification unit proximate to the powered unit of interest. As another example, the location of the trail powered unit position (the last powered vehicle of a consist) may be used to determine the location along the consist at which friction reducing activities take place, for example, to reduce friction for the trailing non-powered vehicles of a consist, or as another example, to dispense friction reduction agents behind the consist.

As another example, friction management activities may be determined based at least in part on track mode markers. Track mode markers may be used to inform an energy management module or control module or system of locations along a route where specific operations must be performed or avoided. For example, track mode markers may indicate limits on tractive or braking efforts, mandatory independent modes, or dynamic braking avoidance zones. In embodiments, the information available from track mode markers may also be used, for example, to identify friction management activities to be performed, or as another example, to identify otherwise appropriate friction management activities that should not be performed. This information may be used, for example, to determine whether or not to perform a given friction modification activity (including, for example, when to perform and when not to perform the activity during a given mission) as well as to determine any limits on the friction modification activity, the amount of friction modification activity to perform, the duration of performance of a friction modification activity, and the frequency of performance of a friction modification activity.

Certain friction management activities may be performed based on information from track mode markers. For example, information regarding curves in a route may be available from the energy management module 214 as well as from track mode markers. Such information regarding curves may include the location of the curve as well as the direction of the curvature and the amount of curvature. Such information may be used, for example, to determine a friction modification activity that includes applying a friction reducing agent to a side or flange of a track. Alternatively or additionally, such information regarding curvature may be used to determine a friction modification activity including dispensing a friction reduction agent to one side of a curve.

Further, information regarding curvature may be used to select a location along the curve for performing a given activity. For example, if a sanding operation is to be performed, but the location of a sand dispensing unit is sufficiently far away from a truck including the wheels of a powered unit and the curvature is sufficient enough, the sand dispensing unit may not be positioned above the rail as the powered unit traverses the curve. In such situations, dispensing would be ineffective and may be avoided by the control unit. Further still, the nozzles or dispensing heads of friction modification units may be articulable, and the control unit may select an appropriate direction for setting the nozzle or dispensing head based on the position of the rail relative to the nozzle or dispensing head based on the amount of curvature and the distance of the nozzle or dispensing head from the wheels.

Alternatively or additionally, information regarding the location of construction sites may be used to determine friction modification activities. For example, certain types of construction areas or performance of a consist through certain construction areas may be harmed by a particular friction modification activity. Thus, as the consist passes those types of construction areas, the particular friction modification activity having a detrimental effect may be prevented by the control unit. On the other hand, certain types of construction areas or performance of a consist through such areas may benefit from a particular friction modification activity. In such a situation, the control unit may implement the particular friction modification activity as the consist passes through the construction area.

Also, certain friction management activities may be prohibited or avoided based on information from track mode markers. For example, information regarding the location of areas such as switches and crossings may be used to identify locations where one or more friction modification activities are inappropriate and to prevent performance of the particular one or more friction modification activities proximate to such locations. For example, certain activities may be prohibited or avoided at crossovers, switches, grade or level crossings, areas under construction, new track, sensitive areas of track, locations for which existing flange lube is already present, or curves. As one example, sanding activities may be prohibited proximate to switches. As another example, high speed compressed air cleaning may be prohibited proximate to a crossing.

As another example, friction management activities may be determined based at least in part on train type information. Train type information may include, for example, information regarding whether the train is an intermodal type, information regarding cargo being transported, such as grain or coal, information from a manifest, or other information regarding the load, including the distribution of the load or locations of various types of cargo along the length of the consist. The control module may use such information to make determinations regarding train handling and power control, as well as friction modification activities corresponding to the determined train handling and power control.

As another example, friction management activities may be determined based at least in part on scheduling information, for example, scheduling information regarding a plurality of consists in a network obtained from, for example, the scheduling system 110. Such information may be obtained, for example, by a friction management module directly from the scheduling system 110, or indirectly from the scheduling system 110 via the energy management module 214 or other portion of the control system 114.

For example, a dispatcher or scheduling system may provide information regarding the number and type of trains traveling on a given route. If multiple trains are traveling on a given section of route, the use of friction modification, as well as the amount of friction modification, may be optimized for the multiple trains using information regarding the multiple trains. For example, if no train has traveled a given section for a relatively long period of time, more friction modification may be used.

Also, information regarding a weather condition, such as rain or snow, may be provided from a dispatcher, scheduling system, or other source. The information regarding the weather may be used to determine a friction management activity or activities, or to modify already planned activities that were planned based on a different weather condition. For example, if a sufficient amount of rain has fallen, rail friction for a portion of the consist (for example, about the first fifty cars) may already be reduced. Thus, an appropriate friction management activity (for example relatively increased sanding for about the first fifty cars if increased friction is desired, or as another example, applying more lubricant after about the first fifty cars if decreased friction is desired) may be selected or modified.

Further, a friction management activity may be undertaken by a first train to benefit a second train that is following the first train along the same section of route. For example, for a section that includes a down grade during braking or coasting, friction enhancement may be beneficial. Thus, the first train may be controlled to perform a friction enhancement activity (e.g. sanding) configured to increase friction for the following train. As additional examples, a dispatcher or scheduling system may provide addition information regarding, construction sites, track mode markers, and route condition.

As another example, friction management activities may be determined based at least in part on diagnostic information. For example, a predicted or anticipated drag may be available from, for example, the energy management module 214. Such a predicted or anticipated drag may be determined based on train and route information. Also, an experienced drag may be sensed, determined from operational parameters, or otherwise determined. The experienced drag may be compared to the predicted drag, and the comparison used to determine or modify friction modification activities.

Additionally or alternatively, information from sensors may be used to determine friction management activities. For example, an acoustic sensor may detect a squeak between the wheels and the route or other audible input that indicates a given friction management activity, such as applying lubricant particular friction modifying agent, may be beneficial. As another examples, other sensors may provide information regarding the availability of a given friction modification unit. Such information may be used when determining a friction modification activity as well as determining which friction modification unit or units will be used to perform the selected activity.

Further, in embodiments, information regarding the location of required or desirable friction modification activities along the route may be logged, and the information subsequently accessed, for example, by vehicles traveling the same portion of the route, and used by friction management modules of the subsequent vehicles in determining friction modification activities to be performed. For example, wheel slip may be identified during a trip. Sand may be added to the location associated with the wheel slip, and the location logged to help build a database of locations identified as requiring sanding. As another example, an acoustic sensor may detect an audible sound such as a wheel squeak or a wheel squeal. Information from the sensor including the type of audible sound as well as the location of its occurrence may then be provided to the friction management module, and the friction management module may then determine an appropriate friction management activity, such as application of lubricant to the location at which the squeak or squeal was detected. The location associated with the squeak or squeal may also be logged and collected in a database for future reference.

Further, the information logged may also identify whether a given logged location was treated with a friction modification activity or not. For example, a first vehicle may traverse a given section of the route, and detect wheel slippage at the given section. However, the first vehicle may not have any sand onboard, and thus does not apply sand to the given section. The database may be provided with information indicating not only that sand was required or desired at the given section, but also that sand was not applied by the first vehicle. Then, at or before a time when a second vehicle travels over the same given section, the friction management module of the second vehicle may access the database and determine a sanding activity for the given section accordingly.

As another example, friction management activities may be determined based at least in part on the availability of a friction modification agent or device, or other resource. For example, as discussed above, a friction modification unit may modify the friction of a portion of a route by cleaning the route with a stream of air, with the air supplied by a line also used to supply air for air braking activities. Information regarding upcoming air braking activities may be obtained, for example, from a trip plan generated by the energy management module 214. If it is known that a substantial portion of the capability or capacity of an air compressor or air delivery system is currently or soon will be required for air braking activities, then the control unit may act to prohibit the use of friction management activities utilizing the air compressor or air delivery system, or as appropriate, may limit the amount of such friction management activities based on the available air supply and the amount of air supply required for the air braking activity.

Also, availability information may include information regarding a volume of friction modifying agent available for a particular friction modification unit, or information regarding the condition or health of a friction modifying unit. For example, if a first friction modifying unit is running low on a friction modifying agent, an alternate friction modifying unit may be selected to perform a friction modifying activity originally designated for the first friction modifying unit. The alternate friction modifying unit may be selected based on proximity to the first friction modifying unit. For example, the nearest friction modifying unit with sufficient friction modifying agent available may be selected. As additional examples, the nearest unit that is forward of the first unit may be selected, or the nearest unit that is rearward of the first unit may be selected. Alternatively or additionally, if a given friction modifying unit or units are low on a given resource, such as lubricant, or if a given resource is relatively costly, the control unit may identify priority locations or times along the route for friction modification that provide the best return on use of friction modification agent and utilize the given unit or units at those points or locations while not performing friction modification at other, lower priority points or locations that do not provide as good a return.

Further, the control unit may use cost information to compare the cost benefit in terms of fuel savings with the cost expended to perform a friction management activity in determining whether to perform a friction management activity or in determining an amount of friction management activity to perform. Further still, in embodiments, one mode of friction management may be used as an alternate for a previously selected or determined mode. For example, if friction enhancement via cleaning of a rail was selected but the air supply for cleaning is not available or the cleaning unit is otherwise not functioning, a sanding operation may be selected as a replacement friction enhancing activity and performed. As another example, when friction modification is generally available and generally inexpensive, friction modification activities may be provided between each powered grouping and non-powered grouping of a consist. However, when friction modification has a more limited availability or is relatively expensive, then, for example, friction modification may be avoided, may be limited to being performed only at the lead and trail powered unit, may be performed based on threshold of size of groupings, or may be performed based upon the relative predicted effectiveness of the activity.

Thus, a control system may weigh different information received from one or more sources and determine an appropriate friction management activity based on the information available to it. The determination may be based, as examples, on cost, performance, or a combination thereof. For example, certain types of information may be prioritized over other types of information to determine friction management activities. Friction management activities may be performed based on a location along a consist, as well as based upon a location along a route being traveled by the consist.

Moreover, information regarding friction modification may also be employed by, for example, the energy management module 214 during operation of the consist. For example, modification of friction between the wheels of cars of the consist and the route provides a different speed of the consist for the same power input. As an example, for a portion of a mission performed at maximum power, and with the top of the rails modified by the application of a friction reducing agent, the speed of the consist will be higher, and travel time reduced for a portion of the mission. As another example, maintaining an overall travel time at a constant while using increased speed for a first portion as discussed above, the speed for another portion of the mission may be reduced to improve fuel efficiency. In embodiments, information regarding, for example, the type, location, and amount of friction modification may be used by the energy management module 214 to revise a trip plan to account for friction management activities.

In the illustrated embodiment, the control system 114 includes a control module 218 that generates control signals for controlling operations of the vehicle 104 (shown in FIG. 1). The control module 218 may receive the trip plan from the energy management module 214 and generate the control signals that automatically change the tractive efforts and/or braking efforts of the propulsion subsystem 118 based on the trip plan. For example, the control module 218 may form the control signals to automatically match the speeds of the vehicle 104 with the speeds dictated by the trip plan for various sections of the trip of the vehicle 104 to the scheduled destination location. Alternatively, the control module 218 may form control signals that are conveyed to an output device 216 disposed on-board the vehicle 104. The output device 216 can visually and/or audibly present instructions to an operator of the vehicle 104 to change the tractive efforts and/or braking efforts of the vehicle 104 based on the control signals. For example, the output device 216 can visually present textual instructions to the operator to increase or decrease the speed of the vehicle 104 to match a designated speed of the trip plan. The above described control activities may also include control of friction management activities.

Figure 5:
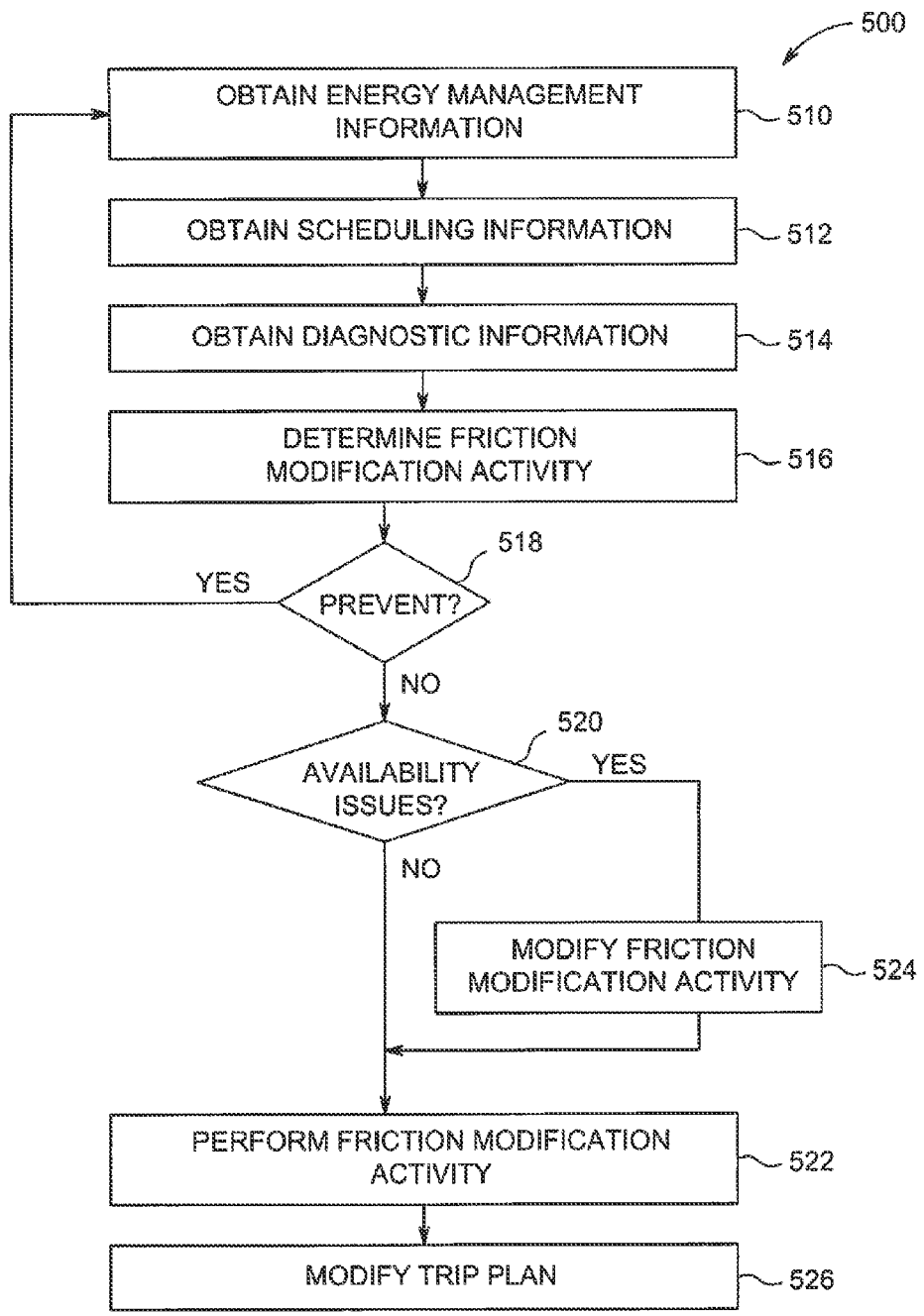
FIG. 5 is a flowchart of one embodiment of a method for modifying a friction coefficient of a route associated with a rail vehicle.

FIG. 5 is a flowchart of one embodiment of a method 500 for modifying a friction coefficient of a route associated with a rail vehicle. The method 500 may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion. As also indicated above, the determination of friction management activities may take place before a mission is performed using expected or anticipated information, or may take place during performance of a mission, for example, using diagnostic information obtained during performance of a mission. Further, in embodiments, a friction management plan may be created before performance of a mission using information available at the time of creation of the friction management plan, and modified during the performance of the mission.

At 510, energy management information is obtained. For example, such information may include information regarding the makeup of a consist, or performance of a consist. The information may also include, for example, information about the route conditions or other information regarding a route over which the consist is traversing or will traverse. Such information may be obtained, for example, from a trip plan or trip profile that has been created by or for an energy management module or control system.

At 512, scheduling information is obtained. For example, such information may include information regarding weather conditions, or the times when other trains will be traversing a given section of route. Such information may be provided, for example, from a dispatcher, or, as another example, by a scheduling system.

At 514, diagnostic information is obtained. Diagnostic information may be obtained, for example, from a sensor or sensors disposed onboard the consist. For example, an acoustic sensor may detect sounds associated with conditions indicating desirability of a given friction management activity. As another example, sensors may provide information regarding an availability of a given friction management resource, such as a level of friction modifying agent available in a reservoir.

At 516, the energy management information, scheduling information, and diagnostic information are used to determine a friction modification activity or activities. The friction modification activity or activities may also be identified by an amount of activity to be performed, a duration of activity to be performed, or a frequency of activity to be performed. The activity may be identified by a location along the consist at which to be performed, as well as a location along a route or a time along a mission at which to be performed. The activity or activities may be selected or determined by weighing or balancing various types of information and prioritizing if any portions of the information indicate inconsistent friction modification activities.

At 518, it is determined if there is any reason to prevent an activity. Prevention may be desirable, for example, if a given activity requires a scarce resource, or as another example, if a given activity may result in an unsafe or otherwise problematic condition of route. For example, sanding may be prevented proximate to switches. If the activity is to be prevented, the method 500 may return to 510 for a subsequent section of route. If the activity is not prevented, the method 500 proceeds to 520.

At 520, it is determined if there are any issues with availability of a resource. If there are no issues with availability the method 500 proceeds to 522. If there are issues with availability, the method 500 proceeds to 524, where the determined activity is modified to account for availability issues. For example, priority locations providing the best return for use of a generally scarce resource may be identified, and the activity permitted only at selected priority locations to provide the most benefit from the resource. As another example, an amount, duration, or frequency of friction modification originally determined may be reduced based on availability. As another example, if an originally selected friction modification unit is not functioning or otherwise not available, an alternate friction modification unit may be selected. After appropriate modifications have been made to the previously determined friction management activity, the method 500 may proceed to 522 (or may return to 510 to determine an appropriate activity for a subsequent portion of route).

At 522, the friction modification activity is performed. Next, at 524, information regarding the performed friction modification activity is used by, for example, the energy management module, to modify the trip plan to account for the friction management activity. For example a speed may be increased or a power setting, such as a notch setting for a throttle, decreased to account for the addition of a friction reducing agent over a portion of route being traversed at high speed.

In another embodiment of a system 600, with reference to FIGS. 6A-6C, the system 600 comprises plural friction modification units 602 (602 refers to the units generally, and 602a, 602b, 602c, etc. refers to particular units) configured to be disposed onboard a vehicle consist 604 having plural vehicles connected with each other. (It may be the case that, in the system, there are some friction modification units that are onboard and some that are offboard, e.g., located wayside.) The plural vehicles of the vehicle consist comprise plural powered units 606a, 606b, 606c capable of self-propulsion and plural non-powered units 608a, 608b that are incapable of self-propulsion. The friction modification units 602 are configured to modify a friction characteristic of a surface 610 of a route over which the vehicle consist travels. The system further comprises a friction management module 612 configured to be communicatively coupled with the friction modification units. The friction management module is configured to control when the friction modification units modify the friction characteristic of the surface of the route based on locations of the friction modification unit within or otherwise with respect to the vehicle consist. For example, in one embodiment, the friction management module is configured, in at least one mode of operation, to control at least a first subset of the friction modification units to increase the friction characteristic of the route immediately upstream of or concurrent with at least one of the powered units along a direction of travel (see arrow) of the vehicle consist. (The "first subset" refers to one or more of the friction management units. The term "concurrent with," in regards to a vehicle, means that the friction characteristic of the route is changed at a location over which the vehicle is currently traveling. The term "immediately upstream," in regards to a vehicle, means that the friction characteristic of the route is changed at a location over which the vehicle is not currently traveling, but which the vehicle will travel at a future point in time, but without any vehicles of a different propulsion category—non-powered units in the case of powered units, and powered units in the case of non-powered units—traveling over that location in the meantime.) The friction management module is further configured, in at least one mode of operation, to control at least a second subset of the friction modification units (a "second subset" referring to one or more of the friction management units, which may be the same units as, some but not all of the same units as, or none of the same units as, the first subset) to decrease the friction characteristic of the route immediately upstream of or concurrent with at least one of the non-powered units along the direction of travel of the vehicle consist.

Thus, in operation, as one example, and with reference to FIG. 6A, the friction management module 612 controls the lead friction modification unit 602a of a lead powered unit 606a to increase the friction characteristic of the route at a location "L," concurrent with the lead vehicle 606a traveling over location L, and immediately upstream of a second powered unit 606b connected to and immediately behind the lead powered unit 606a. To increase the friction characteristic, and depending on the type of friction modification unit in question, the friction modification unit may apply sand, may apply compressed air to remove items from the surface that cause reduced friction, such as water or ice, or the like. The location L may be determined from a trip plan (such as the location being on an uphill grade), or based on consist operations, such as detected wheel slip, for example. As the powered units 606a, 606b travel over the location L, the increased friction may facilitate improved tractive effort, i.e., improved ability and effectiveness in the powered units pulling other vehicles in the consist. However, once the powered units have passed over the location L, it may no longer be desirable for the route surface 610 at location L to have an increased friction characteristic. For example, when non-powered units 608a, 608b travel over the location L, it may be desirable to have a reduced friction characteristic. Thus, according to one aspect, and with reference to FIG. 6B, the friction management module 612 controls the friction modification unit of the consist that is just upstream from the lead non-powered unit 608a, in this case the trailing friction modification unit 602b of the second powered unit 606b, to reduce the friction characteristic of the route surface at L as the friction modification unit 602b passes over that location. The friction management module 612 carries out this control action based on the location of the trailing friction modification unit 602b within the consist, relative to the non-powered units and/or the lead powered unit, and relative to the location L where the friction characteristic is to be modified. To reduce the friction characteristic, and depending on the type of friction modification unit in question, the friction modification unit 602b may apply compressed air to remove sand or other friction enhancing material previously applied to the surface, and/or it may apply lubricant to the surface.

With reference to FIG. 6C, once the non-powered units 608a, 608b have passed the location L, and if there is another powered unit 606c located behind the non-powered units in the direction of travel of the consist, then the friction management module 612, in one mode operation, may control one of the friction modification units in the consist to modify the friction characteristic of the route surface immediately upstream of, or concurrent with, the other powered unit 606c traveling over location L. For example, a lead friction modification unit 602c of the other, trailing powered unit 606c may be controlled by the friction management module, based on its relative position in the consist, to apply compressed air to the location L for at least partial removal of lubricant previously applied to the location ahead of the non-powered units.

Thus, in embodiments, the friction management module is configured for controlling the friction modification units to increase the friction characteristic of the route surface at a location ahead of powered units in a consist (ahead in the direction of movement of the consist) traveling over the location, and to decrease the friction characteristic of the route surface at the location ahead of non-powered units in the consist traveling over the location. Doing so provides for improved tractive effort by the powered units at the location, while facilitating pulling or pushing of the non-powered units as they subsequently or otherwise traverse the location.

The friction management module may be configured for controlling the friction modification units for selective modification of the friction characteristic of the route surface based on location within or otherwise with respect to the vehicle consist, and/or based on the vehicular makeup of the consist relative to the consist as a whole. For example, if a single non-powered unit is located within a group of powered units (such as a fuel tender vehicle within a consist of powered units), the friction management module may be configured to increase the friction characteristic of the route surface for traversal of both the single non-powered unit and the group of powered units, and not to reduce the friction characteristic just for the single non-powered unit. This is because the benefit of friction characteristic modification for a single vehicle in a consist may not be deemed to outweigh the costs associated with modifying the friction characteristic. The friction management module may further be configured for controlling the friction modification units, additionally or alternatively, based on environmental information. For example, if weather conditions are dry at a given location, then it may not be deemed of sufficient benefit for the friction management module to control one or more of the friction modification units to increase the friction characteristic for a final, single trailing powered unit at the end of the consist, e.g., subsequent to applying lubricant. However, if the weather conditions are wet at the location, then it may be sufficiently beneficial, in regards to consist operation, for the friction management module to control one or more of the friction modification units to increase the friction characteristic ahead of the final, trailing powered unit traversing the location (e.g., through at least partial removal of lubricant and application of sand).

Another embodiment relates to a method for a vehicle consist comprising plural powered units (vehicles capable of self-propulsion) and plural non-powered units (vehicles incapable of self-propulsion). The method comprises, at a location of a route along which the vehicle consist travels, controlling plural friction modification units to increase a friction characteristic of a surface of the route for travel over the location by one or more of the powered units. The method further comprises controlling the plural friction modification units to decrease the friction characteristic of the surface of the route at the location, for subsequent travel over the location by one or more of the non-powered units.

In another embodiment of the method, the friction modification units are controlled to increase the friction characteristic of the surface of the route at the location concurrent with or immediately upstream of the one or more of the powered units traveling over the location.

In another embodiment of the method, the friction modification units are controlled to decrease the friction characteristic of the surface of the route at the location concurrent with or immediately upstream of the one or more of the non-powered units traveling over the location.

In another embodiment of the method, the friction characteristic of the surface of the route is increased at the location through application of at least one of sand or compressed air to remove debris.

In another embodiment of the method, the friction characteristic of the surface of the route is decreased at the location through application of at least one of compressed air to remove sand from the surface or lubricant.

In another embodiment of the method, the plural friction modification units are positioned onboard the plural powered units of the vehicle consist.

In another embodiment of the method, the method further comprises controlling the plural friction modification units to increase the friction characteristic of the surface of the route at the location subsequent to the one or more of the non-powered units passing over the location.

In one embodiment, a system (e.g., for modifying friction on a surface of a route) includes a vehicle control system, a friction modification unit, and a friction management module. The vehicle control system is configured to be disposed onboard a vehicle and to obtain a trip plan for the vehicle. The trip plan is based on one or more characteristics of a trip of the vehicle along a route in a transportation network, characteristics of the vehicle, or characteristics of the route along which the vehicle travels during the trip. The trip plan designates at least one or more tractive operations or one or more braking operations of the vehicle during the trip. The friction modification unit is configured to be disposed onboard the vehicle and to modify a friction characteristic of a surface of the route as the vehicle travels on the route. The friction management module is configured to direct the friction modification unit to modify the friction characteristic of the surface of the route based on the trip plan.

In another aspect, the friction management module is further configured to access scheduling information regarding travel of one or more additional vehicles in the transportation network and to use the scheduling information to direct the friction modification unit.

In another aspect, the friction modification unit is included in a set of plural friction modification units onboard the vehicle, with the friction modification units disposed at a corresponding plurality of locations along the vehicle. The friction management module is configured to use information regarding the corresponding plurality of locations of the friction modification units to independently direct the plurality of friction modification units.

In another aspect, the vehicle includes a rail vehicle consist that includes a lead powered unit and a plurality of remote powered units. The friction modification unit is included in a set of plural friction modification units distributed among the lead powered unit and the remote powered units.

In another aspect, the friction modification unit is disposed off-board the vehicle.

In another aspect, the friction management module is configured to prevent a specified friction modification activity of the friction modification unit based on information regarding a location along the route.

In another aspect, the friction modification unit includes a flange lubrication unit configured to dispense lubricant to a flange of a track, and the friction management module is configured to direct the friction modification unit to dispense the lubricant to the flange of the track via the flange lubrication unit proximate to a curve in the track.

In another aspect, the friction management module is further configured to use diagnostic information to direct the friction modification unit. For example, the vehicle may include an acoustic sensor configured to provide information for identifying locations that require lubrication. As an additional example, the diagnostic information includes information regarding locations along the route requiring friction modification, and the system provides information regarding the one or more of the locations along the route to a database.

In another aspect, the vehicle includes a vehicle consist including a lead powered unit and a trail powered unit. The friction management module is configured to use information regarding a location of the trail powered unit to direct the friction modification unit. For example, the friction management module may use information regarding the relative positions of vehicles within a consist, additionally or alternatively to information regarding a geographic position.

In another aspect, the friction management module is configured to use information regarding an availability of a friction modification resource to direct the friction modification unit.

In another aspect, the friction management module is configured to identify priority locations along the route. The priority locations correspond to portions of the route at which friction modification will be of greater benefit than at other locations along the route. The friction management module may be configured to control the friction modification unit based at least in part on the priority locations that are identified. In some embodiments, the priority locations correspond to portions of the route at which friction modification will be of greater benefit than at other locations along the route, for example, portions that meet one or more designated criteria relating to friction modification to a greater extent than one or more other locations.

In another aspect, the friction modification unit includes a friction increasing unit and a friction decreasing unit. The friction increasing unit includes at least one of a sand dispensing unit or an air pressure cleaning unit, and the friction decreasing unit includes a lubrication dispensing unit.

In another aspect, the vehicle control system is configured to modify the trip plan based on one or more friction modification activities performed by the friction modification unit.

In another embodiment, a method (e.g., for modifying friction on a surface of a route) includes accessing information of an energy management module of a vehicle. The information includes at least one of positional information, route information, or trip information. The positional information includes information regarding the location of a friction modification unit on the vehicle, the route information includes information regarding characteristics of a route over which the vehicle travels, or the trip information includes information regarding tractive or braking efforts of the vehicle. The method also includes autonomously determining, at a controller, a friction modification activity, using the information of the energy management module. The friction modification activity is configured to modify a surface over which the vehicle is traveling. The method also includes controlling the friction modification unit to perform the friction modification activity.

In another aspect, the method includes accessing scheduling information regarding additional vehicles of a transportation network including the vehicle, and controlling the friction modification unit using the scheduling information.

In another aspect, the method includes independently controlling a plurality of friction modification units disposed at a corresponding plurality of locations along the vehicle using information regarding the corresponding plurality of locations.

In another aspect, the method includes preventing a specified friction modification activity based on information regarding a location along the route. For example, the term "prevent" may mean to inhibit performance of the activity, to not control to perform the activity, or to control in such a manner so as to not perform a friction modification activity at the location.

In another aspect, the method includes obtaining diagnostic information regarding operation of the vehicle during traversal of the vehicle over the route. The method also includes using the diagnostic information to control the friction modification unit.

In another aspect, the method includes using information regarding an availability of a friction modification resource to control the friction modification unit.

In another aspect, the method includes identifying priority locations along the route. The priority locations correspond to portions of the route at which the friction modification activity will be of greater benefit than at other locations along the route. The method also includes controlling the friction modification unit to perform the friction modification activity at the priority locations and preventing the friction modification unit from performing the friction modification activity at the other locations.

In another aspect, the method includes modifying a trip plan based upon the friction modification activity.

In another embodiment, another system (e.g., for modifying friction on a surface of a route) includes an energy management module configured to be disposed onboard a vehicle that travels in a transportation network formed from interconnected routes. The energy management module is configured to generate a trip plan for a control unit of the vehicle that is used to control tractive efforts of the vehicle as the vehicle travels in the transportation network. The system also includes a friction modification unit configured to be disposed onboard the vehicle. The friction modification unit is configured to modify a friction characteristic of a surface of a route over which the vehicle travels by at least one of adding a material to the surface or removing a previously present material from the surface. Further, the system includes a friction management module configured to be disposed onboard the vehicle and operably connected to the friction modification unit. The friction management module configured to receive information from the energy management module and to use the information received from the energy management module to control the friction modification unit. The information received from the energy management module includes at least one of positional information representative of the location of the friction modification unit on the vehicle, route information representative of information regarding characteristics of the route over which the vehicle is traveling, or trip information representative of at least one of tractive or braking efforts of the vehicle. The energy management module is configured to modify the trip plan using information regarding one or more friction management activities performed by the friction modification unit.

In another aspect, the friction management module is further configured to access scheduling information regarding additional vehicles in the transportation network, and the friction management module is configured to use the scheduling information to control the friction modification unit.

In another aspect, the system includes a plurality of friction modification units disposed at a corresponding plurality of locations along the vehicle. The friction management module is configured to use information regarding the corresponding plurality of locations of the friction modification units to independently control the plurality of friction modification units.

In another aspect, the friction management module is configured to use information regarding an availability of a friction modification resource to control the friction modification unit.

In another aspect, the friction management module is configured to identify priority locations along the route. The priority locations corresponding to portions of the route at which friction modification will be of greater benefit than at other locations along the route. The friction management module is configured to control the friction identification unit based at least in part on the priority locations that are identified.

In another embodiment, another system (e.g., for modifying friction on a surface of a route) includes a friction modification unit and a friction management module. The friction modification unit is configured to be disposed onboard a vehicle consist having plural vehicles connected with each other. The friction modification unit also is configured to modify a friction characteristic of a surface of a route over which the vehicle consist travels. The friction management module is configured to be communicatively coupled with the friction modification unit. The friction management module also is configured to control when the friction modification unit modifies the friction characteristic of the surface of the route based on a location of the friction modification unit in the vehicle consist.

In another aspect, the vehicles of the vehicle consist include a first powered unit capable of self-propulsion and at least one non-powered unit that is incapable of self-propulsion. The friction management module is configured to direct the friction modification unit to reduce the friction characteristic of the route when the friction management unit is disposed upstream of the at least one non-powered unit along a direction of travel of the vehicle consist.

In another aspect, the vehicles of the vehicle consist include plural powered units capable of self-propulsion and one or more non-powered units that are incapable of self-propulsion. The friction management module is configured to direct the friction modification unit to reduce the friction characteristic of the route when the friction management unit is disposed upstream of the one or more non-powered units along a direction of travel of the vehicle consist and the friction management module is configured to prevent the friction modification unit from reducing the friction characteristic of the route when the friction management unit is disposed upstream of one or more of the powered units along the direction of travel.

In another aspect, the vehicles of the vehicle consist include plural powered units capable of self-propulsion and plural non-powered units that are incapable of self-propulsion. The friction management module is configured to direct the friction modification unit to reduce the friction characteristic of the route based on a number of the non-powered units between the friction management unit and a first powered unit located downstream of the friction modification unit along a direction of travel of the vehicle consist.

In another aspect, the friction management module is further configured to access scheduling information regarding travel of additional vehicles in the transportation network. The friction management module is configured to use the scheduling information to control the friction modification unit.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A system comprising:
   a vehicle control system configured to be disposed onboard a vehicle and to obtain a trip plan for the vehicle, the trip plan based on one or more characteristics of a trip of the vehicle along a route in a transportation network, characteristics of the vehicle, or characteristics of the route along which the vehicle travels during the trip, the trip plan designating at least one of one or more tractive operations or one or more braking operations of the vehicle during the trip;
   a friction modification unit configured to modify a friction characteristic of a surface of the route as the vehicle travels on the route; and
   a friction management module configured to direct the friction modification unit to modify the friction characteristic of the surface of the route based on at least one of upcoming tractive efforts or upcoming braking efforts designated by the trip plan, wherein the friction management module is configured to determine at least one of an availability of a friction modification resource of the friction modification unit to perform a friction modifying activity or whether the friction modification unit is able to perform the friction modifying activity, and to select an alternate friction modification unit to perform the friction modifying activity responsive to at least one of the friction modification resource not being sufficient to perform the friction modifying activity or the friction modification unit being unable to perform the friction modifying activity, wherein the friction modification unit includes a flange lubrication unit configured to dispense lubricant to a flange of a track, wherein the friction management module is configured to direct the friction modification unit to dispense the lubricant to the flange of the track via the flange lubrication unit proximate to a curve in the track, wherein the friction management module is configured to identify the curve in the track, for directing the friction modification unit to dispense the lubricant to the flange of the track via the flange lubrication unit proximate to the curve in the track, based on at least one of an identified location of the vehicle or the trip plan.

2. The system of claim 1, wherein the friction management module is further configured to access scheduling information regarding travel of one or more additional vehicles in the transportation network and to use the scheduling information to direct the friction modification unit.

3. The system of claim 1, wherein the friction modification unit is included in a set of plural friction modification units onboard the vehicle, the friction modification units disposed at a corresponding plurality of locations along the vehicle, and wherein the friction management module is configured to use information regarding the corresponding plurality of locations of the friction modification units to independently direct the plurality of friction modification units.

4. The system of claim 1, wherein the friction modification unit is disposed off-board the vehicle.

5. The system of claim 1, wherein the vehicle comprises a rail vehicle consist that includes a lead powered unit and a plurality of remote powered units, and wherein the friction modification unit is included in a set of plural friction modification units distributed among the lead powered unit and the remote powered units.

6. The system of claim 1, wherein the friction management module is configured to prevent a specified friction modification activity of the friction modification unit based on information regarding a location along the route.

7. The system of claim 1, wherein the friction management module is further configured to use diagnostic information to direct the friction modification unit.

8. The system of claim 1, further comprising an acoustic sensor configured to provide the diagnostic information for identifying locations that require lubrication.

9. The system of claim 1, wherein the diagnostic information includes information regarding locations along the route requiring friction modification, and wherein the system is configured to provide information regarding the one or more of the locations along the route to a database.

10. The system of claim 1, wherein the vehicle comprises a vehicle consist including a lead powered unit and a trail powered unit, and wherein the friction management module is configured to use information regarding a location of the trail powered unit to direct the friction modification unit.

11. The system of claim 1, wherein the friction management module is configured to identify priority locations along the route, the priority locations corresponding to portions of the route at which friction modification will be of greater benefit than at other locations along the route, and to control the friction modification unit based at least in part on the priority locations that are identified.

12. The system of claim 1, wherein the friction modification unit comprises a friction increasing unit and a friction decreasing unit, the friction increasing unit comprising at least one of a sand dispensing unit or an air pressure cleaning unit, the friction decreasing unit including a lubrication dispensing unit.

13. The system of claim 1, wherein the vehicle control system is configured to modify the trip plan based on at least one of the availability of the friction modification resource or a cost of the friction modification resource.

14. The system of claim 1, wherein the vehicle control system is configured to, based on an upcoming air braking activity, at least one of limit or prohibit use of a friction management activity utilizing an air delivery system to be used for the upcoming air braking activity.

15. A method comprising:
  accessing information of an energy management module of a vehicle, the information including at least one of positional information, route information, or trip information, the positional information comprising information regarding the location of a friction modification unit on the vehicle, the route information comprising information regarding characteristics of a route over which the vehicle travels, or the trip information comprising information regarding at least one of upcoming tractive or braking efforts of the vehicle designated by a trip plan;
  autonomously determining a friction modification activity at a controller based on the at least one of upcoming tractive or braking efforts designated by the trip plan using the information of the energy management module, the friction modification activity configured to modify a surface over which the vehicle is traveling;
  determining at least one of an availability of a friction modification resource of the friction modification unit to perform the friction modification activity or whether the friction modification unit is able to perform the friction modification activity;
  selecting an alternate friction modification unit to perform the friction modification activity responsive to at least one of the friction modification resource not being sufficient to perform the friction modification activity or the friction modification unit being unable to perform the friction modification activity, wherein the friction modification unit includes a flange lubrication unit configured to dispense lubricant to a flange of a track, the friction modification unit controlled to dispense the lubricant to the flange of the track via the flange lubrication unit proximate to a curve in the track, wherein the controller is configured to identify the curve in the track, for directing the friction modification unit to dispense the lubricant to the flange of the track via the flange lubrication unit proximate to the curve in the track, based on at least one of an identified location of the vehicle or the trip plan; and
  controlling the friction modification unit to perform the friction modification activity.

16. The method of claim 15, further comprising accessing scheduling information regarding additional vehicles of a transportation network including the vehicle, and controlling the friction modification unit using the scheduling information.

17. The method of claim 15, wherein the friction modification unit is one of a plurality of friction modification units on the vehicle, and wherein the method further comprises independently controlling the plurality of friction modification units disposed at a corresponding plurality of locations along the vehicle using information regarding the corresponding plurality of locations.

18. The method of claim 15, further comprising preventing a specified friction modification activity at a location along the route based on the route information.

19. The method of claim 15, further comprising:
  obtaining diagnostic information regarding operation of the vehicle during traversal of the vehicle over the route; and
  using the diagnostic information to control the friction modification unit.

20. The method of claim 15, further comprising:
  identifying priority locations along the route, the priority locations corresponding to portions of the route at which the friction modification activity will be of greater benefit than at other locations along the route; and
  controlling the friction modification unit to perform the friction modification activity at the priority locations and preventing the friction modification unit from performing the friction modification activity at the other locations.

21. The method of claim 15, further comprising modifying a trip plan based upon at least one of the availability of the friction modification resource or a cost of the friction modification resource.

22. A system comprising:
  an energy management module configured to be disposed onboard a vehicle that travels in a transportation network formed from interconnected routes, the energy management module configured to generate a trip plan for a control unit of the vehicle that is used to control tractive efforts of the vehicle as the vehicle travels in the transportation network;
  a friction modification unit configured to be disposed onboard the vehicle, the friction modification unit configured to modify a friction characteristic of a surface of a route over which the vehicle travels by at least one of adding a material to the surface or removing a previously present material from the surface; and
  a friction management module configured to be disposed onboard the vehicle and operably connected to the friction modification unit, the friction management module configured to receive information from the energy management module and to control the friction modification unit, based on at least one of upcoming tractive efforts or upcoming braking efforts designated by the trip plan, wherein the friction management module is configured to determine at least one of an availability of a friction modification resource of the friction modification unit to perform a friction modifying activity or whether the friction modification unit is able to perform the friction modifying activity, and to select an alternate friction modification unit to perform the friction modifying activity responsive to at least one of the friction modification resource not being sufficient to perform the friction modifying activity or the friction modification unit being unable to perform the friction modifying activity, wherein the friction modification unit includes a flange lubrication unit configured to dispense lubricant to a flange of a track, wherein the friction management module is configured to direct the friction modification unit to dispense the lubricant to the flange of the track via the flange lubrication unit proximate to a curve in the track, wherein the friction management module is configured to identify the curve in the track, for directing the friction modification unit to dispense the lubricant to the flange of the track via the flange lubrication unit proximate to the curve in the track, based on at least one of an identified location of the vehicle or the trip plan; and wherein the energy management module is configured to modify the trip plan using information regarding the friction modifying activity performed.

23. The system of claim 22, wherein the friction management module is further configured to access scheduling information regarding additional vehicles in the transportation network, and wherein the friction management module is configured to use the scheduling information to control the friction modification unit.

24. The system of claim 22, wherein the friction modification unit is one of a plurality of friction modification units disposed at a corresponding plurality of locations on the vehicle, wherein the friction management module is configured to use information regarding the corresponding plurality of locations of the friction modification units to independently control the plurality of friction modification units.

25. The system of claim 22, wherein the friction management module is configured to identify priority locations along the route, the priority locations corresponding to portions of the route at which friction modification will be of greater benefit than at other locations along the route, and wherein the friction management module is configured to control the friction modification unit based at least in part on the priority locations that are identified.

26. A system comprising:
a friction modification unit configured to be disposed onboard a vehicle consist having plural vehicles connected with each other, the friction modification unit also configured to modify a friction characteristic of a surface of a route of a transportation network over which the vehicle consist travels; and
a friction management module configured to be communicatively coupled with the friction modification unit, the friction management module configured to control when the friction modification unit modifies the friction characteristic of the surface of the route based on a location of the friction modification unit with respect to the vehicle consist and based on at least one of upcoming tractive efforts or upcoming braking efforts designated by a trip plan, wherein the friction management module is configured to determine at least one of an availability of a friction modification resource of the friction modification unit to perform a friction modifying activity or whether the friction modification unit is able to perform the friction modifying activity, and to select an alternate friction modification unit to perform the friction modifying activity responsive to at least one of the friction modification resource not being sufficient to perform the friction modifying activity or the friction modification unit being unable to perform the friction modifying activity, wherein the friction modification unit includes a flange lubrication unit configured to dispense lubricant to a flange of a track, wherein the friction management module is configured to direct the friction modification unit to dispense the lubricant to the flange of the track via the flange lubrication unit proximate to a curve in the track, wherein the friction management module is configured to identify the curve in the track, for directing the friction modification unit to dispense the lubricant to the flange of the track via the flange lubrication unit proximate to the curve in the track, based on at least one of an identified location of the vehicle or the trip plan.

27. The system of claim 26, wherein the vehicles of the vehicle consist include a first powered unit capable of self-propulsion and at least one non-powered unit that is incapable of self-propulsion, and wherein the friction management module is configured in at least one mode of operation to direct the friction modification unit to reduce the friction characteristic of the route when the friction management unit is disposed upstream of the at least one non-powered unit along a direction of travel of the vehicle consist.

28. The system of claim 26, wherein the vehicles of the vehicle consist include plural powered units capable of self-propulsion and one or more non-powered units that are incapable of self-propulsion, and wherein the friction management module is configured in at least one mode of operation to direct the friction modification unit to reduce the friction characteristic of the route when the friction management module is disposed upstream of the one or more non-powered units along a direction of travel of the vehicle consist and the friction management module is configured to prevent the friction modification unit from reducing the friction characteristic of the route when the friction management module is disposed upstream of one or more of the powered units along the direction of travel.

29. The system of claim 26, wherein the vehicles of the vehicle consist include plural powered units capable of self-propulsion and plural non-powered units that are incapable of self-propulsion, and wherein the friction management module is configured in at least one mode of operation to direct the friction modification unit to reduce the friction characteristic of the route based on a number of the non-powered units between the friction management module and a first powered unit located downstream of the friction modification unit along a direction of travel of the vehicle consist.

30. The system of claim 26, wherein the friction management module is further configured to access scheduling information regarding travel of additional vehicles in the transportation network, and wherein the friction management module is configured to use the scheduling information to control the friction modification unit.

31. The system of claim 26, wherein:
the plural vehicles of the vehicle consist comprise plural powered units capable of self-propulsion and plural non-powered units that are incapable of self-propulsion;
the friction modification unit is one of plural friction modification units disposed onboard or offboard the powered units of the vehicle consist, the plural friction modification units configured to modify the friction characteristic of the surface of the route over which the vehicle consist travels;

the friction management module is configured to be communicatively coupled with the plural friction modification units; and the friction management module is configured, in at least one mode of operation: to control at least a first subset of the friction modification units to increase the friction characteristic of the route immediately upstream of or concurrent with at least one of the powered units along a direction of travel of the vehicle consist; and to control at least a second subset of the friction modification units to decrease the friction characteristic of the route immediately upstream of or concurrent with at least one of the non-powered units along the direction of travel of the vehicle consist.

32. The system of claim 31, wherein the friction management module is configured, in the at least one mode of operation:

to control the at least the second subset of the friction modification units to apply a lubricant to the surface of the route, for decreasing the friction characteristic of the route; and to control the at least the first subset of the friction modification units to at least partially remove the lubricant from the surface of the route, for increasing the friction characteristic of the route.

\* \* \* \* \*